(12) United States Patent
Tatsuta et al.

(10) Patent No.: US 6,364,209 B1
(45) Date of Patent: Apr. 2, 2002

(54) DATA READING APPARATUS

(75) Inventors: Seiji Tatsuta, Hino; Akira Matsui, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/503,147

(22) Filed: Feb. 15, 2000

(30) Foreign Application Priority Data

Feb. 17, 1999 (JP) ............................................. 11-038525

(51) Int. Cl.⁷ .............................................. G06K 19/06
(52) U.S. Cl. ........................ 235/494; 235/488; 235/492; 235/493; 235/460; 235/454; 235/446; 235/435
(58) Field of Search ................................. 235/494, 492, 235/454, 493, 460

(56) References Cited

U.S. PATENT DOCUMENTS

| | | | | |
|---|---|---|---|---|
| 5,724,364 A | * | 3/1998 | Mori et al. ...................... 371/6 |
| 5,866,895 A | | 2/1999 | Fukuda et al. ............... 235/464 |
| 5,896,403 A | | 4/1999 | Nagasaki et al. .......... 371/37.1 |
| 5,898,166 A | | 4/1999 | Fukuda et al. ............... 235/494 |
| 5,943,448 A | * | 8/1999 | Tatsuta ........................ 382/270 |
| 6,052,813 A | * | 4/2000 | Nagasaki et al. ............ 714/752 |
| 6,058,225 A | * | 5/2000 | Mori et al. .................. 382/321 |
| 6,116,507 A | * | 9/2000 | Fukuda et al. ............... 235/454 |
| 6,119,937 A | * | 9/2000 | Wang et al. .................. 235/454 |
| 6,170,750 B1 | * | 1/2001 | Ueno ....................... 235/462.1 |
| 6,186,405 B1 | * | 2/2001 | Yoshioka ..................... 235/494 |
| 6,219,460 B1 | * | 4/2001 | Tatsuta ........................ 382/270 |

FOREIGN PATENT DOCUMENTS

JP 411007512 A * 1/1999

* cited by examiner

*Primary Examiner*—Michael G. Lee
*Assistant Examiner*—Daniel Walsh
(74) *Attorney, Agent, or Firm*—Frishauf, Holtz, Goodman, Langer & Chick, P.C.

(57) ABSTRACT

A dot code contains a plurality of data dots arranged according to the data to be recorded and markers providing data dot read reference points for reading the data dots and showing a predetermined relationship relative to the data dots in terms of a predetermined physical characteristic quantity, the data dots and the markers being arranged to show a predetermined positional relationship according a predetermined format. The parameter setting section determines parameters necessary for the marker detecting section to detect markers from the dot code image stored in the image data storage section. The parameters are determined on the basis of the relationship between the markers and the data dots in terms of the predetermined physical characteristic quantity in such a way that markers are detected firstly without detecting data dots.

20 Claims, 16 Drawing Sheets

DOT CODE HAVING A DOUBLE SIZE

… (US 6,364,209 B1)

DATA READING APPARATUS

CROSS-REFERENCE TO RELATED APPLICATION

This application is based upon and claims the benefit of priority from the prior Japanese Patent Application No. 11-038525, filed Feb. 17, 1999, the entire contents of which are incorporated herein by reference.

BACKGROUND OF THE INVENTION

This invention relates to a data reading apparatus adapted to scan and read data such as sound data, image data or text data recorded in the form of optically readable dot codes on a recording medium such as paper.

To date, various devices are known for scanning and reading data such as sound data, image data or text data recorded in the form of optically readable dot codes on a recording medium such as paper.

Of the known data reading apparatus of the type under consideration, those disclosed in U.S. Pat. Nos. 5,896,403 and 5,866,895 are manually operable apparatuses that can read a large volume of data recorded in the form of dot codes on a recording medium such as paper. They represent an innovative technology that could not have been achieved hitherto by means of one-dimensional or two-dimensional bar codes and are feasibly used for recording audio data on a recording medium such as paper and for reproducing audio data from such a recording medium.

According to the U.S. Pat. Nos. 5,896,403 and 5,866,895, a dot code 100 to be used with such an apparatus is basically formed by a plurality of blocks 101 that are arranged two-dimensionally side by side as shown in FIG. 1 of the accompanying drawings. Each of the blocks includes: a data dot region which is a region where the data to be recorded of the block obtained by dividing the original data concerning a piece of information in the form of sound, image or text is arranged as a dot image (hereinafter referred to as data dot 102) formed by white dots or black dots representing respective bit values of "0s" or "1s" and arranged according to a predetermined format; a plurality of pattern dots 103 arranged to show a predetermined positional relationship relative to the data dot region in order to provide reference points for reading the data dots 102; markers 104 arranged at the four corners of the block, each containing a predetermined number of black dots arranged continuously in succession; and a block address pattern 105 containing a block address and an error detection or error correction sign and arranged along a boundary line separating the block and an adjacently located block so that a plurality of different blocks may be identified when they are read.

With such a dot code 100, if the dot code extends beyond the field of view of the data reading apparatus or the area that can be picked up by the data reading apparatus with a single shot, the entire original data can be reconstructed from the data contained in the blocks so long all the data dots 102 of each and every one of the blocks 101 are picked up somehow along with the block address (block address pattern 105) assigned to the block 101 so that a large volume of data may be recorded on and retrieved from a sheet of paper.

Now, the configuration of such a data reading apparatus adapted to read a dot code 100 will be described below.

The data reading apparatus at least comprises: an imaging section including a lighting unit typically containing an LED for illuminating a dot code 100, an optical system for forming an image of the dot code 100 from the light reflected by the dot code 100 and a solid image pickup element such as CCD for picking up the image formed by the optical system; an image data storage section for converting the signal output from the imaging section for the picked up image into binary data and storing the obtained binary data as image data; a marker detecting section for detecting the markers from the image data stored in the image data storage section; a read reference points determining section for determining read reference points to be used for reading the data dots 102; a data dot reading section for reading the data dots 102 by referring to the determined read reference points; and a reproduction/output section for reproducing and outputting the restored original data that may be voiced information.

If the markers have the largest diameter equal to the length of five data dots 102 that are arranged linearly and continuously arranged side by side, the number of consecutively arranged data dots 102 is limited (modulated) to less than five. Thus, the marker detecting section detects the markers from the. image data storage section by utilizing this fact and discriminating markers 104 and data dots 102 on the basis of the above threshold.

The read reference points determining section determines a plurality of pattern dot reading points from positions of two adjacently located markers 104 detected by the marker detecting section and related known information (format information) and detects each of the pattern dots 103 by referring to the determined plurality of pattern dot reading points. Then, it computationally determines the read reference point (corresponding to the real center of the marker 104) by minimizing the value of the error function determined on the basis of the distance from each of the pattern dot reading points and the center of each of the actually detected pattern dots 103. The data dot reading section divides the gap between any two markers that are located at four corners of each block with lines that are spaced apart by a predetermined distance and reads the pixel value of each of the crossings of the vertical lines and the horizontal lines, or the lattice points, to see if it is black or white.

For the marker detecting section to discriminate markers 104 from data dots 102 and detect the former, it has to use certain parameters including, for instance, a threshold value for the length of a black run that is used for detecting markers 104. If the threshold value is not set appropriately, the marker detecting section may not be able to detect markers 104 or may mistake data dots 102 for markers 104 to consequently detect may wrong markers. The set of the threshold value is particularly important when the data reading apparatus is designed to read dot codes 1 containing data dots 102 having different sizes.

This will be discussed further by referring to FIGS. 2A and 2B.

Referring firstly to FIG. 2A, assume here that each data dot 102 has a diameter equal to "1" and data dots 102 are so modulated that there will be no consecutively arranged four dots, whereas each marker 104 has a diameter of "5". Since data dots 102 are arranged according to the output of the data to be recorded, there may be three consecutively arranged data dots 102 as shown in FIG. 2A. When detecting markers 104 from an image containing both data dots 102 and markers 104 on the basis of the lengths of black runs, only the black runs of the markers 104 can be detected efficiently without erroneously detecting consecutively arranged data dots 102 by setting "4" for the threshold value for the length of a black run for detecting markers 104. On the other hand, three consecutively arranged data dots 102 in the image will be detected as candidates for markers if "3" is set for the threshold value for the length of a black run for detecting markers 104 so that a long and tedious process may have to be followed to finally detect correct markers. Meanwhile, it will be appreciated that no markers will be detected if a too large value is set for the threshold value. there may be three consecutively arranged data dots 102 as shown in FIG. 2A. When detecting markers 104 from an image containing both data dots 102 and markers 104 on the basis of the lengths of black runs, only the black runs of the markers 104 can be detected efficiently without erroneously detecting consecutively arranged data dots 102 by setting "4" for the threshold value for the length of a black run for detecting markers 104. On the other hand, three consecutively arranged data dots 102 in the image will be detected as candidates for markers if "13" is set for the threshold value for the length of a black run for detecting markers 104 so that a long and tedious process may have to be followed to finally detect correct markers. Meanwhile, it will be appreciated that no markers will be detected if a too large value is set for the threshold value.

Thus, data dots 102 will not be mistaken for markers 104 in the image of FIG. 2A when "4" is set as for the threshold value for the length of a black run as parameter for detecting markers 104.

However, if the same data reading apparatus is used for reading a dot code having an image as shown in FIG. 2B where both the size of each data dot 102 and that of each marker 104 are doubled from those of the dot code of FIG. 2A and still the threshold value of "4" is used for the length of a black run as parameter for detecting markers, then black runs not smaller than "4" will be found not only in makers 104 but also in many consecutive data dots 102 and the latter will be mistaken for so many markers so that it is not longer possible to carry out a correct marker detecting operation. It will be appreciated that the optimal value for the length of a black run for detecting markers 104 in the dot code of FIG. 2B is "8".

Thus, when a same data reading apparatus is used for reading dot codes having respective sizes that are different from each other, the threshold value for detecting markers will have to be set appropriately depending on the application for which it is used.

U.S. Pat. No. 5,898,166 proposes a data reading apparatus adapted to this problem.

A data reading apparatus according to the above identified U.S. Patent is adapted to read dot codes having respective sizes that are different from each other by detecting markers with initial parameters and setting parameters for another time on the basis of the number of the detected markers. If the number of the detected markers exceeds a predetermined number, the apparatus decides that it has mistaken data dots for markers because the set threshold value is too small and sets a larger threshold value. If, on the other hand, no marker is detected, the apparatus decides that the set threshold value is too large and sets a smaller threshold value to detect markers once again.

Thus, with the above data reading apparatus, the threshold value for detecting markers is set appropriately depending on the application for which it is used so that it can correctly detect markers from data codes having respective sizes that are different from each other. In other words, a single data reading apparatus can be used to read different dot codes having respective sizes that are different from each other.

However, the above cited patent document of U.S. Pat. No. 5,898,166 does not discuss how the initial parameters are set appropriately when the size of the dot code to be read for the first time by the data reading apparatus is not known.

In other words, the data reading apparatus may not be able to detect markers 104 properly or mistake data dots 102 for markers to erroneously detect many wrong markers in the initial stages of operation of the apparatus.

If many wrong markers are erroneously detected, a long and tedious process will have to be followed until only the right markers 104 are detected. This means that the operation of reading the data dots on a real time basis within a processing unit period of a frame of image of a dot code in the imaging section cannot be carried out and hence the data read out by the apparatus may be deficient.

BRIEF SUMMARY OF THE INVENTION

In view of the above identified problem of the prior art, it is therefore the object of the present invention to provide a data reading apparatus that is adapted to reliably reduce the risk of detecting many wrong markers in the initial stages of operation of reading dot codes of the apparatus and set initial parameters appropriately according to the application for which it is used in order to read dot codes having respective sizes that are different from each other.

According to an aspect of the present invention, there is provided a data reading apparatus comprising:

an imaging section for picking up an image of an optically readable dot code containing a plurality of data dots arranged according to the data to be recorded and markers providing data dot read reference points for reading the data dots and showing a predetermined relationship relative to the data dots in terms of a predetermined physical characteristic quantity, the data dots and the markers being arranged to show a predetermined positional relationship;

an image data storage section for storing the image data of the dot code picked up by the imaging section;

a parameter setting section for setting parameters to be used for detecting markers on the basis of the relationship between the data dots and the markers in terms of the predetermined physical characteristic quantity;

a marker detecting section for detecting markers from the image data stored in the image data storage section on the basis of the parameters set by the parameter setting section;

a data dot read reference points determining section for determining the data dot read reference points for reading the data dots of the dot code on the basis of the markers detected by the marker detecting section; and a data dot reading section for reading the data dots by referring to the data dot read reference points determined by the data dot read reference points determining section, wherein the parameter setting section being adapted to determine parameters suitable for detecting markers firstly without detecting data dots from the image data of the dot code stored in the image data storage section on the basis of the relative relationship between the data dots and the markers in terms of the physical characteristic quantity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Now, the present invention will be described by referring to the accompanying drawing that illustrates preferred embodiments of the invention.

[1st Embodiment]

Firstly, the first embodiment of data reading apparatus according to the invention will be described below.

Figure 1:
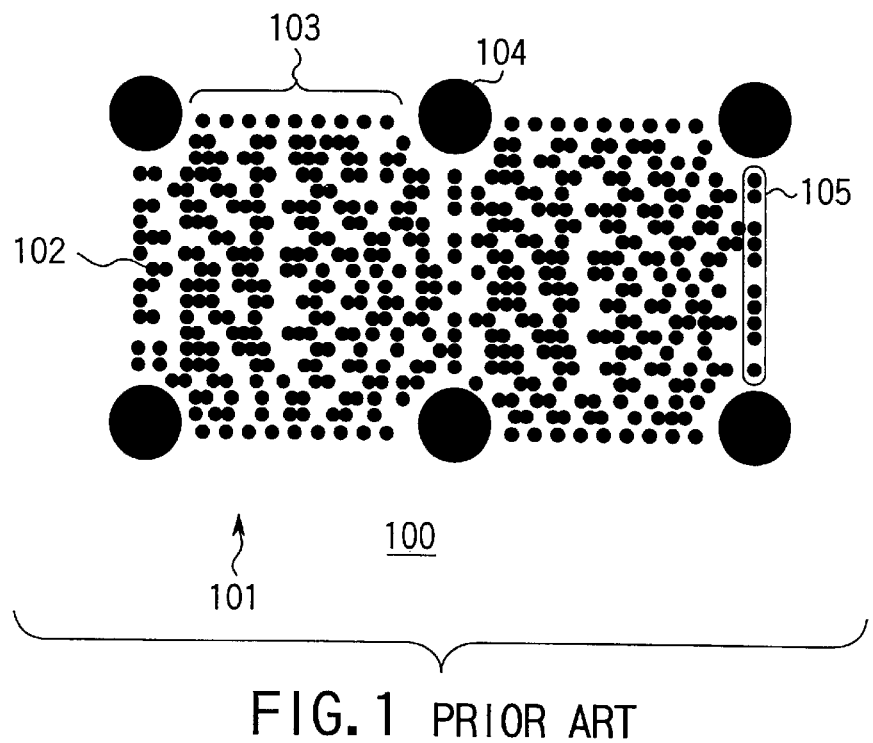
FIG. 1 is a schematic illustration of the physical format of a dot code.
Figure 2A:
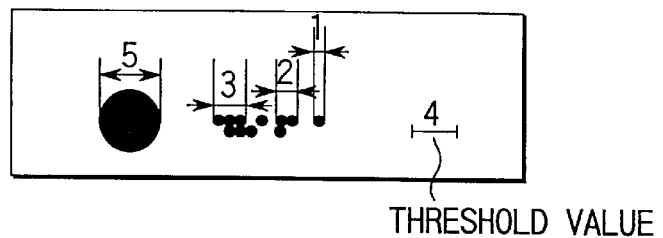
FIGS. 2A and 2B are schematic illustrations of dot codes having respective sizes that are different from each other.
Figure 2B:
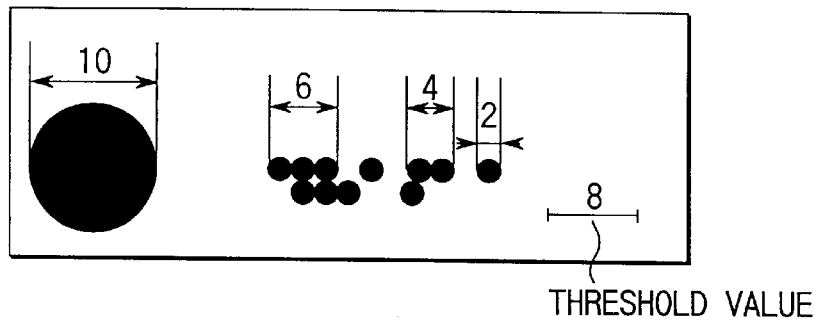
Figure 3:
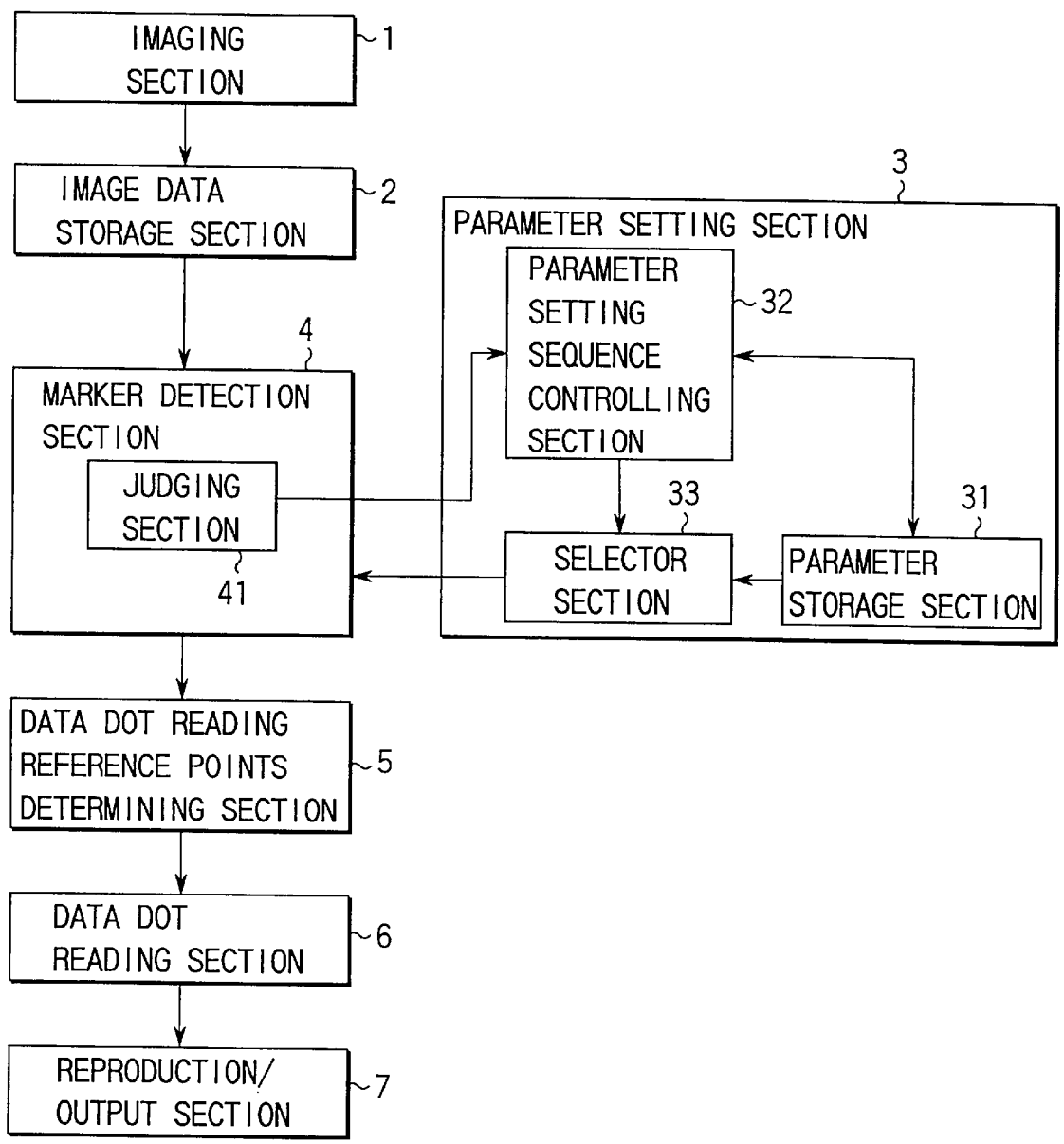
FIG. 3 is a schematic block diagram of a first embodiment of data reading apparatus according to the invention.

Referring to FIG. 3, this embodiment of data reading apparatus comprises: an imaging section 1 including a lighting unit (not shown.) typically containing an LED for illuminating a dot code, an optical system (not shown) for forming an image of the dot code from the light reflected by the dot code and a solid image pickup element (not shown) such as CCD for picking up the image formed by the optical system; an image data storage section 2 for converting the signal output from the imaging section 1 for the picked up image into binary data and storing the obtained binary data as image data; a parameter setting section 3 for setting parameters to be used for detecting markers; a marker detecting section 4 for detecting the markers from the image data stored in the image data storage section 2 by using the parameters set by the parameter setting section 3; a data dot read reference points determining section 5 for determining data dot read reference points to be used for reading the data dots; a data dot reading section 6 for reading the data dots by referring to the determined data dot read reference points; and a reproduction/output section 7 for reproducing and outputting the restored original data that may be voiced information. The parameter setting section 3 includes a parameter storage section 31, a parameter setting sequence controlling section 32 and a selector section 33, whereas the marker detecting section 4 includes a judging section 41.

Now, the operation and the effect of this embodiment data reading apparatus will be discussed below.

Figure 4A:
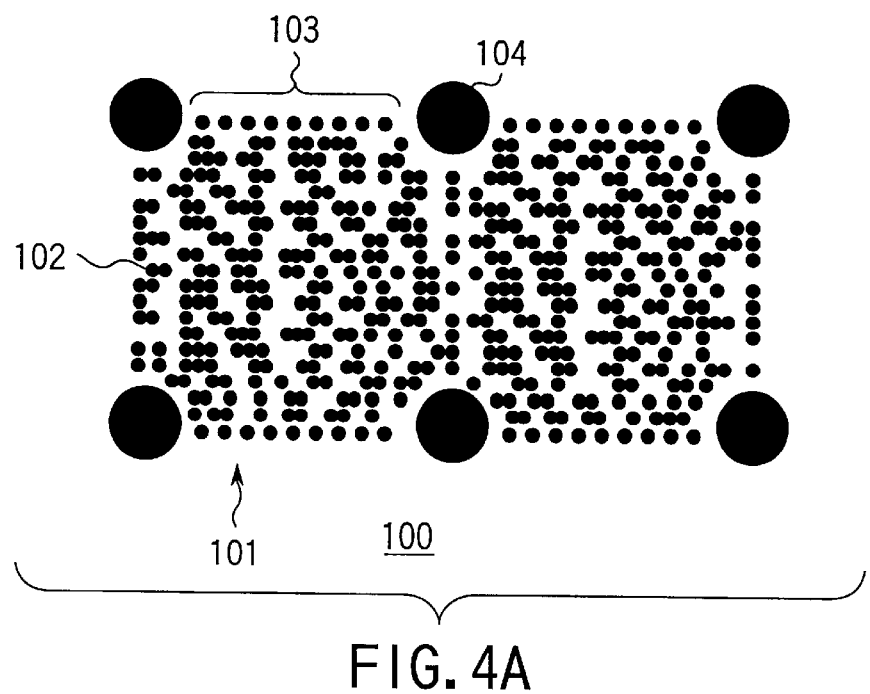
FIGS. 4A through 4C are schematic illustrations of three dot codes having respective sized that are different from each other.

Firstly, the imaging section 1 picks up an image of the dot code to be read that is recorded on a recording medium by means of an image pickup device such as CCD and converts the image into an electric signal, which is then stored in the image data storage section 2. A dot code typically comprises a plurality of data dots arranged according to the data to be recorded that may be voice information and markers to be used for determining data dot read reference points for reading the data dots and having a size that is dimensionally correlated with the size of the data dots to show a predetermined relationship in terms of predetermined physical characteristic quantity, and is divided into a plurality of blocks that are arranged according to a predetermined format. For example, a dot code 100 may have a configuration as shown in FIG. 4A, where the markers 104 and the data dots 102 have a predetermined relationship in terms of physical characteristic quantity (area or diameter).

The parameter setting section 3 sets parameters necessary for the marker detecting section 4 to detect markers on the basis of the dot code image stored in the image data storage section 2. While the parameters will be discussed in detail hereinafter, the parameter storage section 31 stores parameters in advance that are used for detecting markers 104 without detecting data dots 102, whereas the parameter setting sequence controlling section 32 controls the selector section 33 in such a way that the markers 104 are detected firstly without detecting any data dots 102 and sequentially selects parameters from a plurality of parameters stored in the parameter storage section 31. The selected parameters are then set in the marker detecting section 4.

Then, the marker detecting section 4 detects markers 104 from the dot code image, using the set parameters. At this time, the judging section 41 determines if markers are detected or not and, if not marker is detected, it suspends the operation and prevents it from proceeding to the step of reading data dots 102.

The data dot read reference points determining section 5 determines data dot read reference points for reading the data dots 102 on the basis of the detected positions of markers and the data dot reading section 6 determines the point for reading each of the data dots 102 on the basis of the determined data dot read reference points and the code format and reads the data dots 102.

Thus, when reading data from the dot code 100, the embodiment firstly detects markers 104 from the picked up code image that contains a mixture of data dots 102 and markers 104 and, thereafter, it determines the point for reading each of the data dots 102 on the basis of the positions of the detected markers and actually reads the data dots 102 to retrieve the original data.

Figure 5:
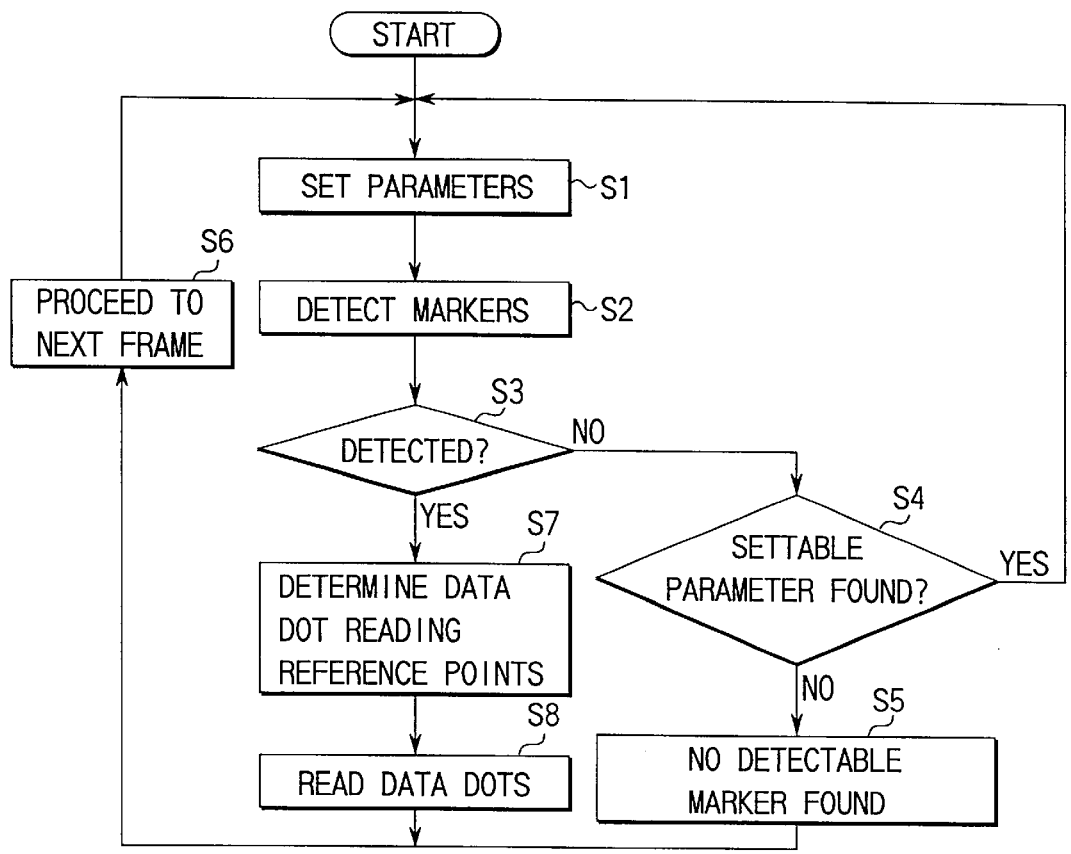
FIG. 5 is a flow chart of the operation of reading a dot code of the embodiment of FIG. 3.

This operation will be discussed in detail by referring to the flow chart of FIG. 5 illustrating an example of reading a dot code 100 having a configuration as shown in FIG. 4A.

Figure 4B:
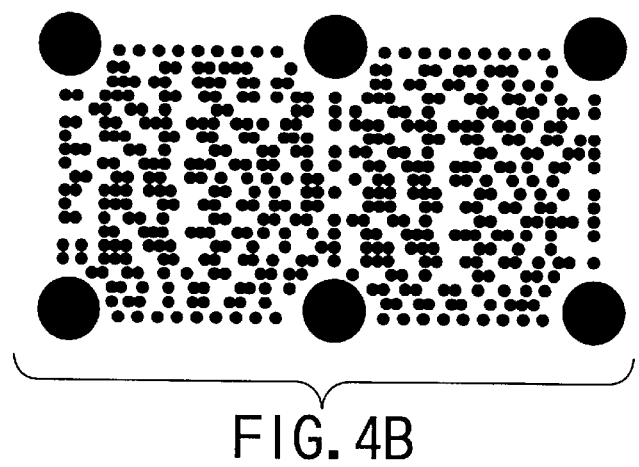
Figure 4C:
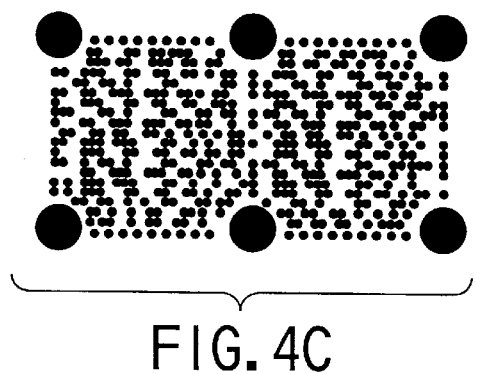

In FIG. 4A, both the markers 104 and the data dots 102 have a circular contour but the markers 104 are larger than the data dots 102, the former having a diameter five times greater than the latter. Note that the dot code may change its size as shown in FIGS. 4A through 4C, maintaining the overall proportion, depending on the recording apparatus that recorded it. In other words, the dimensional relationship between the markers 104 and the data dots 102 is maintained regardless of the size of the dot code.

Assume here that a dot code may be expressed with three different sizes as shown in FIGS. 4A through 4C (and the data reading apparatus is adapted to read a dot code with any of the three different sizes). Then, three marker detecting parameters corresponding to the three different sizes are provided in order to detect markers 104 prior to detecting data dots 102. They will be referred to as the first parameter, the second parameter and the third parameter respectively. Then, these three parameters are stored in the parameter storage section 31 in advance.

Then, the parameter setting sequence controlling section 32 controls the selector section 33 in such a way that the latter firstly selects the parameter corresponding to a dot code with the largest size, or the first parameter, out of the parameters stored in the parameter storage section 31 and thus the selector section 33 takes out the first parameter from the parameter storage section 31 and sets it in the marker detecting section 4 (Step S1).

While the method with which the parameters to be stored in the parameter storage section 31 are selected will be discussed in detail hereinafter, they may be selected on the basis of the relationship of the data dots 102 and the markers 104 in terms of physical characteristic quantity and the allowable range for the absolute value of the physical characteristic quantity of the dot code. The order in which the parameters are set will be such that markers 104 are detected without detecting data dots 102. Thus, if markers 104 are larger than data dots 102 as shown in FIG. 4A, the parameter for a dot code having the largest size will be set first.

Thereafter, the marker detecting section 4 detects markers 104 from the image (frame) picked up by the imaging section 1 and stored in the image data storage section 2 by using the set marker detection parameters (Step S2). The process of detecting markers 104 may be conducted typically by using a method of raster-scanning the image of the dot code, detecting a black run having a length good for a maker 104 to be detected and then detecting black pixels linked to the detected black run collectively as marker 104. With such a method, the marker detecting parameter will be the threshold value of run length to be used for discriminating a maker 104 from a data dot 102 and selecting the former.

Then, the judging section 41 determines if markers 104 are detected or not (Step S3). If no marker 104 is detected in Step S3, the parameter setting sequence controlling section 32 determines if there is a parameter stored in the parameter storage section 31 that can be set in the marker detecting section 4 and hence corresponds to a dot code with a size smaller than the size of a dot code corresponding to the parameter set in Step S1 above or not (Step S4). If there is a parameter that can be set in the marker detection section 4, the parameter setting sequence controlling section 32 causes the selector section 33 to take the parameter and the operation returns to Step S1, where the marker detecting parameter is set in the marker detecting section 4 to repeat the above marker detecting process.

If it is found in Step S4 that there is not any parameter that can be set in the marker detecting section 4 and hence all the parameters stored in the parameter storage section 31 are used for detecting markers but no marker is detected, it is determined that the frame does not contain any marker 104 (Step S5) and the operation proceeds to the next step of processing the next frame (Step S6).

If, on the other hand, markers 104 are detected in Step S3, the data dot read reference points determining section 5 determines data dot read reference points on the basis of the positions of the detected markers (Step S7). More specifically, the data dot read reference points determining section 5 selects four markers 104 arranged at the four corners of a block 101 on the basis of the positions of the detected plurality of markers 104 and the format of the dot code that is known and uses the coordinates of the centers of the four markers 104 to define the data dot read reference points there.

Thereafter, the data dot reading section 6 divides the distance between the two data dot read reference points located with the number of data dots arranged therebetween both horizontally and vertically to define crossings, which are then selected as points for reading data dots. The pixel located on a crossing will be read as "1" if it is black, whereas the pixel located on a crossing will be read as "0" if it is white. In this way, all the data dots 102 will be read (Step S8). After completing the data dot reading, the operation proceeds to the next step of processing the next frame (Step S6).

Now, the technique of selecting parameters for detecting markers that are to be stored in the parameter storage section 31 will be discussed.

Figure 6A:
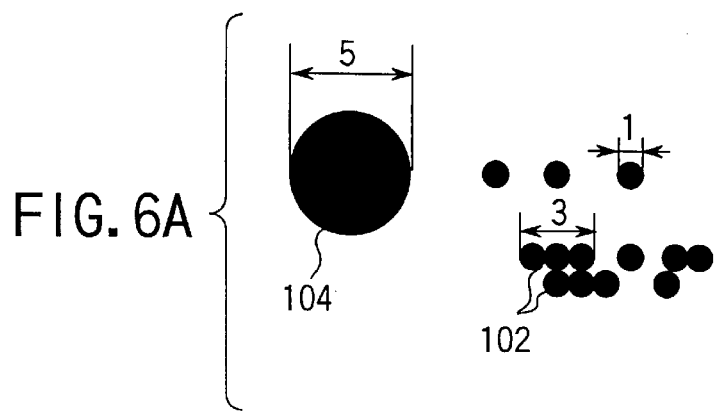
FIG. 6A is a schematic illustration of the relationship of the size of a marker and that of a data dot that are used as physical characteristic quantity.
Figure 6B:
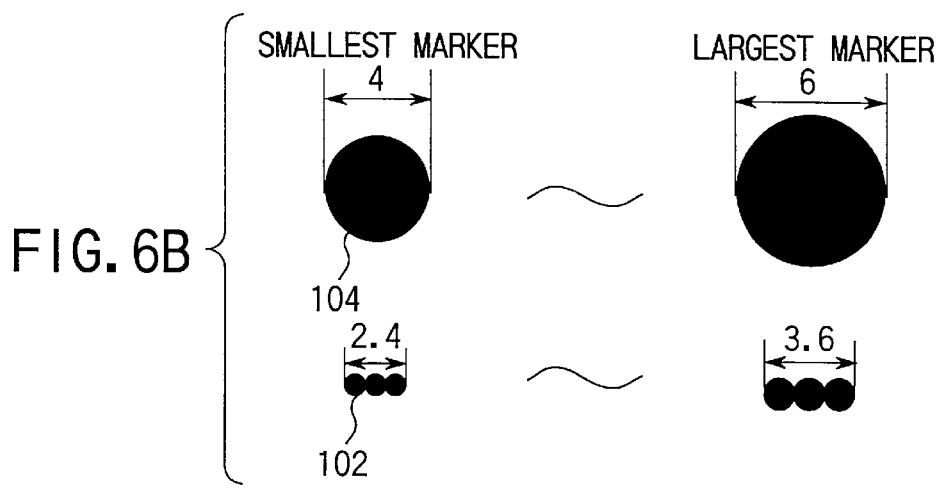
FIG. 6B is a schematic illustration of the relationship of the size of a marker and that of a data dot when the dot code is tolerated for dimensional expansion/contraction of ±20%.

Assume that the dot code to be read has a configuration as shown in FIG. 4A and each marker 104 has a diameter equal to "5" while each data dot 102 has a diameter equal to "1" and the number of consecutive dots is limited to three by modulation as shown in FIG. 6A. Then, the largest run length to be detected is "5" for markers and "3" for data dots. If an image of picked up data dot can expand/contract dimensionally up to ±20% due to fluctuations in the magnification of an optical system of recording apparatus or data reading apparatus and/or for some other reasons as shown if FIG. 6B, the largest run length can be between "4" and "6" among the markers and between "2.4" and "3.6" among the portion of data dots. Then, the average of the largest possible run length of "3.6" of a data dot portion and the smallest possible run length of "4" of a marker, which is equal to "3.8", is stored in the parameter storage section 31 and used as the threshold value of run length to be used for detecting markers. The marker detecting section 4 raster-scans the dot code image and detects any black runs having a length greater than the set run length of "3.8" so that black pixels linked to each of the detected black runs are treated collectively as marker 104. With this arrangement, the risk of mistaking data dots for markers before detecting right markers can be eliminated to reduce the time required for detecting right markers 104 if the state of the recorded dot code is not known and the run length to be detected can vary within a range of tolerance. Additionally, the time required for determining parameters can be eliminated by computationally determining them and storing them in advance.

In the case of the above example, it will be appreciated that the parameter setting sequence controlling section 32 and the selector section 33 are not needed because it is only necessary to store a single threshold value as parameter. Additionally, the judging section 41 is not an indispensable component, although it may be used to take the role of determining that the apparatus cannot detect any marker 104, if such is the case, and causing the operation to stop moving forward to the process of reading data dots 102 or issuing an alarm. Then, it will be possible for the apparatus to take necessary action depending on if markers 104 are detected or not and reliably perform its operation of reading a dot code.

Figure 6C:
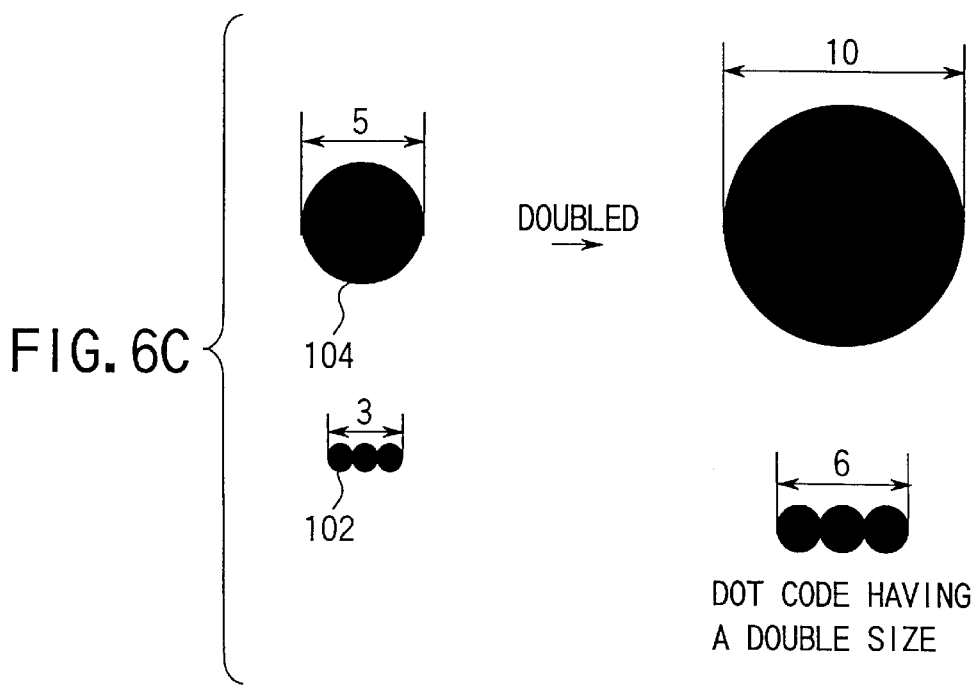
FIG. 6C is a schematic illustration of the relationship of the size of a marker and that of a data dot when the dot code is tolerated for dimensional expansion/contraction of +100%.

Now, the operation of the data reading apparatus when a data dot is allowed to expand dimensionally up to +100% will be discussed. Then, the largest possible run length of the dot code will be "10" for a marker and "6" for a data dot portion as shown in FIG. 6C so that it is no longer possible to discriminate a marker 104 from data dots by means of a single threshold value of run length. That is, a considerable of wrong markers may be mistakenly detected from the data dot portion to remarkably reduce the efficiency of the operation of detecting markers if a parameter for a dot code having a small size is used and the picked up image represents a dot code having a large size, whereas no marker 104 will be detected if a parameter for a dot code having a large size is used and the picked up image represents a dot code having a small size.

Thus, the above described method for setting parameters is used and appropriate threshold values of run length will be determined respectively for dot codes with sizes that are different from each other. Then, the determined threshold values will be used selectively to detect only markers 104. More specifically, the average of "10" and "6", or "8", will be used for the first parameter and the average of "5" and "3", or "4", will be used for the second parameter and the two threshold values of run length will be stored in the parameter storage section 31. Then, since a marker 104 is larger than a data dot 102, the parameter setting sequence controlling section 32 controls the selector section 33 in such a way that the parameter for a dot code having the larger size, or the first parameter, is set in the selector section 33 to detect markers.

Thus, if the apparatus picked up an image of a dot code containing markers having a size of "10", the value of "8" is set as the first parameter for the threshold value of run length so that markers 104 will be detected without erroneously detecting wrong markers from data dots. If, on the other hand, the apparatus picked up an image of a dot code containing markers having a size of "5", the value of "8" is also set as the first parameter for the threshold value of run length. Then, however, no marker will be detected by the apparatus, using such a parameter. Therefore, the apparatus sets and uses "4" as the second parameter for the threshold value of run length so that consequently markers 104 will be detected without erroneously detecting wrong markers from data dots. In case of detecting wrong markers, a series of processes for determining whether or not they are markers and rejecting them when they are not markers are necessary, so that a longer processing time is required, but such a long processing time will be prevented by avoiding detection of wrong markers.

Thus, according to the invention, it is also possible to detect only markers 104 without detecting wrong markers from data dots and reduce the time required for detecting markers when a plurality of parameters that are different from each other are used for reading dot codes having different physical characteristic quantities.

Now, an instance where the dot code to be read is allowed to have a large range of tolerance and markers may vary rather continuously will be discussed.

Figure 7A:
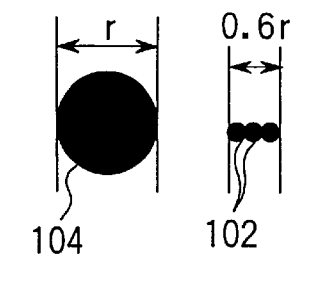
FIG. 7A is a schematic illustration of the relationship of the size of a marker and that of a data dot when the largest run length of data dots is 60% of that of markers (to show a ratio of 3:5)
Figure 7B:
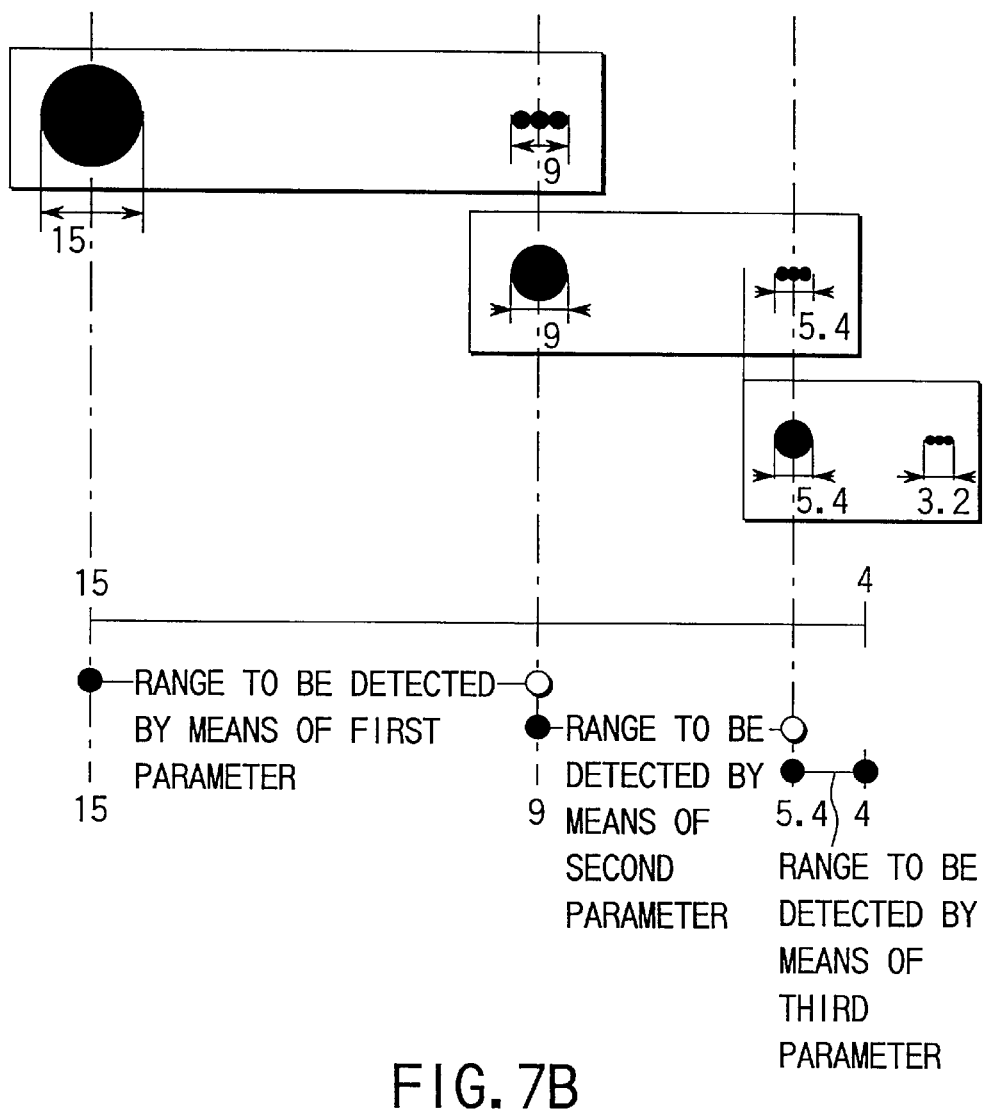
FIG. 7B is a schematic illustration of the size of markers of the dot code of FIG. 7A that can be detected by using the first through third parameters when the size is tolerated to vary between "15" and "4"

Referring to FIG. 7A illustrating a dot code, where the largest run length of data dots is 60% of that of marker to be detected (to show a ratio of 3:5), assume that the size of markers 104 may vary within a tolerable range between "15" and "4" in the dot code. Then, a considerable of wrong markers may be mistakenly detected from the data dot portion to remarkably reduce the efficiency of the operation of detecting markers if a parameter for a dot code containing markers with a size of "4" is used and the picked up image represents a dot code containing markers with a size of "15". Thus, the range between "15" and "4" is divided into a plurality of sub-ranges as shown in FIG. 7B and optimal parameters are determined the respective sub-range so that the obtained parameters may be selectively used. In this case, the range is divided into a plurality of sub-ranges and parameters are determined in a following manner.

Firstly, the largest run length of data dots will be "9" in a dot code containing markers with the largest size of "15" from the above ratio of the largest run length of data dots to that of marker. Thus, the value of "9" is set for the threshold value of run length for the first parameter and the marker detecting section 4 detects black runs longer than this threshold value and therefore black pixels linked to such black runs to correctly detect markers 104 having a size within a range between "15" and "9" without mistakenly detecting data dots.

Then, the largest run length of data dots of the dot code having the smallest marker size of "9" that can be detected by means of the first parameter is determined to be equal to "5.4". Thus, this value of "5.4" is used for the threshold value of run length for the second parameter so that markers 104 of a dot code having a size within a range between "9" and "5.4" will be detected without mistakenly detecting data dots.

Similarly, the largest run length of data dots of the smallest dot code that can be detected by means of the second parameter will be "3.2" from the above ratio of the largest run length of "5.4" to the largest marker size of "9". However, in view of the fact that the marker size of the smallest dot code to be read is "4", the threshold value of run length for the third parameter will be made equal to "4".

Then, the first through third parameters determined in this way are stored in the parameter storage section 31 as those for detecting markers that are greater than corresponding data dots and the parameter setting sequence controlling section 32 controls the selector section 33 so as to use the first parameter first for the dot code with the largest size in order to detect markers from the dot code. With this arrangement, the sizes of markers 104 to be detected by the above parameters will be between "15" and "9", between "9" and "5.4" and between "5.4" and "4" respectively to cover the entire range of size of markers to be detected that is necessary and sufficient for the marker detecting operation so that the apparatus would not mistake data dots 102 for markers 104 even in a dot code whose size is not known. Thus, according to the invention, markers 104 can be detected efficiently with a minimal number of parameters.

There can be occasions where the largest run length of markers and/or that of data dots may fluctuate due to the fluctuations in the phase relationship during the imaging operation, the conditions of binarization and/or other factors. If such is the case, parameters will be determined in a manner as described below.

Assume here that, in a dot code where the largest run length of markers and that of data dots show a ratio of "5:3" as in the above example, the ratio and the run length can vary by 5% and "0.1" respectively. The ratio of the largest run lengths will be between "5:3.15" and "5:2.85" and the largest run length of data dots will be "15×3.15/5=9.45" for markers with the largest size of "5". Then, the threshold value of run length for the first parameter is made equal to "9.55" with an allowable margin of "0.1" and the marker detecting section detects black runs having a length equal to or greater than the threshold value and hence black pixels linked to them as markers by means of the first parameter. Then, the largest run length of data dots of a dot code containing markers with the smallest marker size of "9.55" that can be detected by means of the first parameter is determined to be equal to "9.55×3.15/5=6.02". Then, the threshold value of run length for the second parameter is made equal to "6.12" with an allowable margin of "0.1" and the marker detecting section can detect markers of a dot code having a marker size found within a range between "9.55" and "6.12". Similarly, the largest run length of data dots of a dot code having the smallest size that can be detected by means of the second parameter is determined to be equal to "6.12×3.15/5=3.86". However, in view of the fact that the marker size of the smallest dot code to be read is "4", the threshold value of run length for the third parameter will be made equal to "4". Then, the first through third parameters determined in this way are stored in the parameter storage section 31 as those for detecting markers that are greater than corresponding data dots and the parameter setting sequence controlling section 32 controls the selector section 33 so as to use the first parameter first for the dot code with the largest size in order to detect markers from the dot code. With this arrangement, the sizes of markers 104 to be detected by the above parameters will be between "15" and "9.55", between "9.55" and "6.12" and between "6.12" and "4" respectively to cover the entire range of size of markers to be detected that is necessary and sufficient for the marker detecting operation so that the apparatus would not mistake data dots 102 for markers 104 even in a dot code whose size is not known. Thus, according to the invention, markers 104 can be detected efficiently with a minimal number of parameters.

Thus, according to the invention, markers 104 can be detected by using threshold values, which may be run lengths, and maintaining a predetermined dimensional relationship between markers 104 and data dots 102.

It may be appreciated that the above described method of determining parameters is applicable not only to dot codes where the physical characteristic quantities that differentiate markers 104 and data dots are their sizes but also to dot codes where the physical characteristic quantities that differentiate markers 104 and data dots are their colors, their optical densities or their profiles.

Figure 8A:
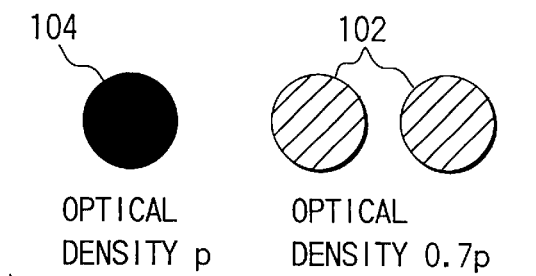
FIG. 8A is a schematic illustration of the relationship of the optical density of a marker and that of a data dot that are used as physical characteristic quantity.
Figure 8B:
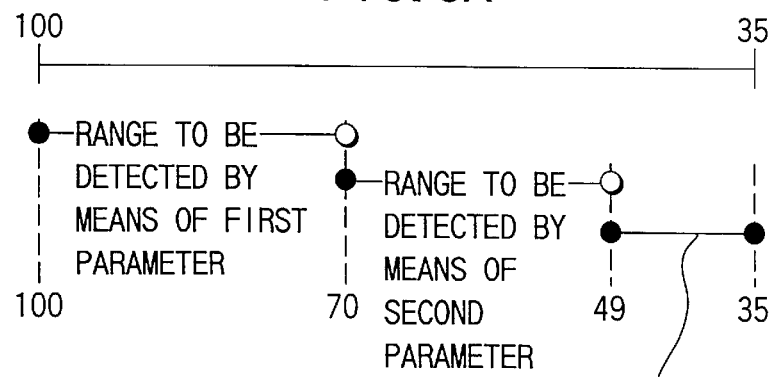
FIG. 8B is a schematic illustration of the optical density of markers of the dot code of FIG. 8A that can be detected by using the first through third parameters when the optical density is tolerated to vary between "100" and "35"

For example, referring to FIG. 8A, illustrating an arrangement for setting parameters to be used for detecting markers 104 without detecting any data dot 102 from a dot code where physical characteristic quantities that differentiate markers 104 from data dots are their optical densities. In the instance of FIG. 8A, data dots 102 are designed to have an optical density of 70% of that of markers 104. If markers 104 are tolerated to show a density between "100" and "35" in the dot code, the data reading apparatus determines a threshold value of optical density of "70" for the first parameter, that of "49" for the second parameter and that of "35" for the third parameter by means of the above described method of determining parameters and stores them in the parameter storage section 31 and uses the first parameter first in an operation of detecting parameter from a dot code. Thus, the marker detecting section 31 detects pixels showing an optical density equal to or greater than the set threshold value of optical density in order to detect markers 104.

Thus, according to the invention, markers 104 can be detected by using threshold values of optical densities and maintaining a predetermined relationship between markers 104 and data dots 102 in terms of optical density.

As described above, with this embodiment of data reading apparatus according to the invention, the risk of mistaking data dots for markers before detecting right markers can be eliminated to reduce the time required for detecting right markers 104 by setting appropriate parameter(s) to be used for detecting markers if the state of the recorded dot code is not known so that the entire operation of detecting markers can be carried out efficiently with less load.

[2nd Embodiment]

Now, the second embodiment of the invention will be described below.

Figure 9:
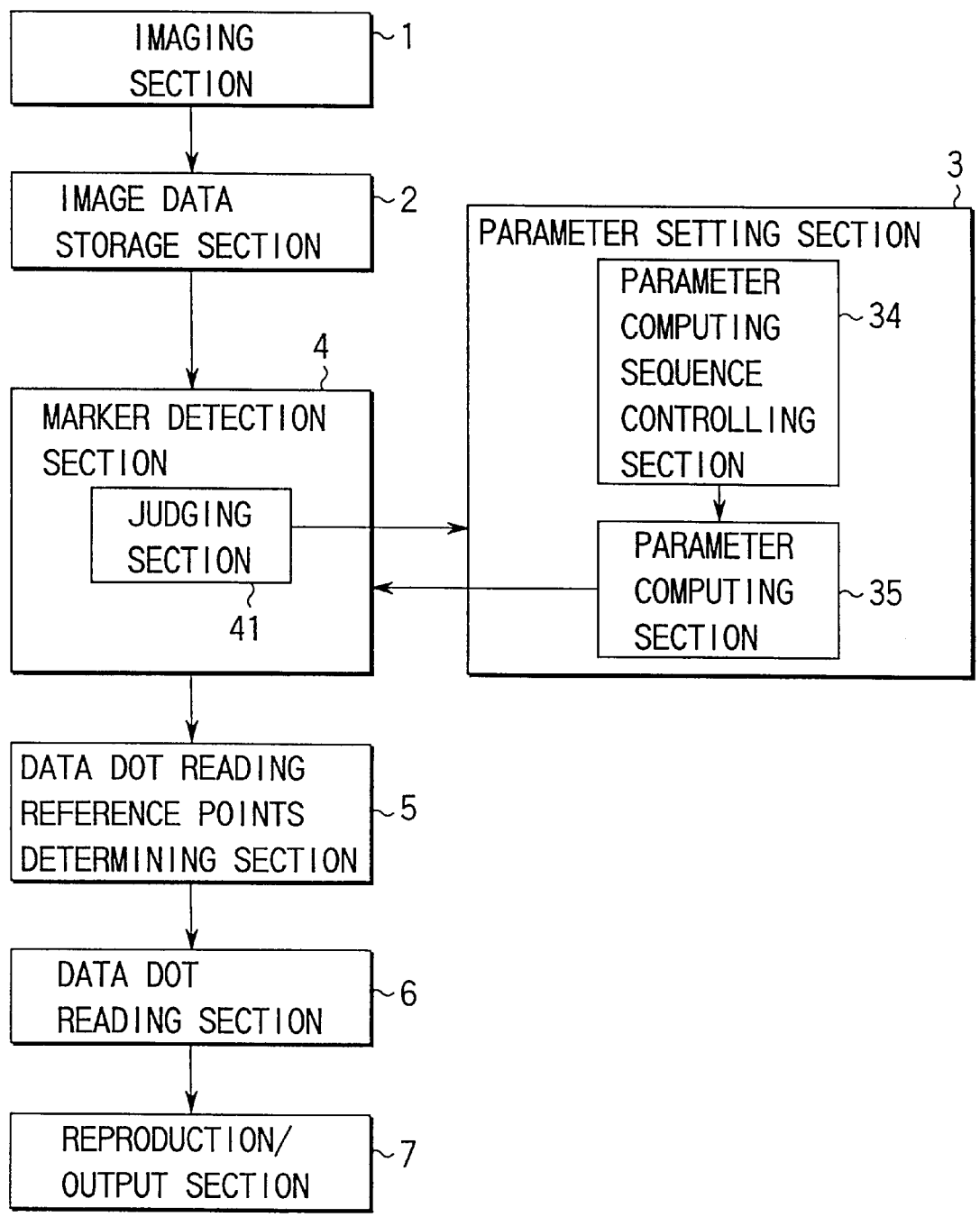
FIG. 9 is a schematic block diagram of a second embodiment of data reading apparatus according to the invention.

Referring to FIG. 9, this embodiment of data reading apparatus comprises an imaging section 1, an image data storage section 2, a parameter setting section 3, a marker detecting section 4, a data dot read reference points determining section 5, a data dot reading section 6 and a reproduction/output section 7. The parameter setting section 3 includes a parameter computing sequence controlling section 34 and a parameter computing section 35, whereas the marker detecting section 4 includes a judging section 41.

The operation and the effect of the second embodiment of data reading apparatus will be described below. However, the components of this embodiment that are same as those of the first embodiment are denoted respectively by the same reference numerals and would not be described any further.

The parameter computing section 35 computationally determines parameter(s) to be used for detecting markers on the basis of the relationship between a physical characteristic quantity of markers 104 and that of data dots 102 and the dimensional range of markers to be detected that are known. The method used for computationally determining parameters is same as the method for determining parameters to be stored in the parameter storage section 31 of the first embodiment. The parameter computing sequence controlling section 34 may not be needed when a single parameter is determined. However, when a plurality of parameters that are different from each other have to be determined sequentially, the parameter computing sequence controlling section 34 computationally determines the parameters according to the required sequence.

Referring to FIG. 7A illustrating a dot code, where the largest run length of data dots is 60% of that of markers to be detected, assume that the size of markers 104 may vary within a tolerable range between "15" and "4" in the dot code.

Then, the parameter computing sequence controlling section 34 controls the parameter computing section 35 on the basis of the above information to cause the latter to computationally determine the first parameter applicable to large markers. Thus, the parameter computing section 35 computes the largest run length (15×0.6=9) of data dots in the dot code containing markers having the largest size of "15" from the given information and determines the threshold value of run length of "9" with which no wrong marker will be detected from data dots 102. Then, the parameter setting section 3 sets this threshold value of "9" of run length for the first parameter.

Then marker detecting section 4 then detects black runs having a length greater than this value and therefore black pixels linked to such black runs to correctly detect markers 104 having a size within a range between "15" and "9" without mistakenly detecting data dots. Then, if the judging section 41 determines that markers are detected by the set first parameter, data dot read reference points are determined as in the case of the first embodiment and the process of reading data dots 102 will be started.

If, on the other hand, no marker 104 is detected by means of the first parameter, the parameter computing sequence controlling section 34 controls the parameter computing section 35 so as to cause the latter to computationally determine the next parameter. Then, the parameter computing section 35 controls the parameter computing section 35 so as to cause the latter to computationally determine the first parameter applicable to large markers. Thus, the parameter computing section 35 computes the largest run length (9×0.6=5.4) of data dots in a dot code containing markers having the smallest size (equal to "9") that can be read by means of the set first parameter and the parameter setting section 3 sets this threshold value of "5.4" of run length for the second parameter.

The marker detecting section 4 detects markers by means of this set second parameter but, if no parameter is detected by using this second parameter, the parameter computing sequence controlling section 34 causes the parameter computing section 35 to compute the third parameter and the marker detecting section 4 detects markers by means of this set third parameter. This process of determining the next parameter and detecting markers by means of the determined parameter is repeated until markers are detected by the marker detecting section 4 or parameters are determined for all the dot codes from which markers should be detected. In the above described instance, all the dot codes from which markers should be detected are covered by the first through third parameters so that the process of determining the next parameter would not be conducted beyond the third parameter.

As described above, with the second embodiment, parameters are computationally determined in advance on the basis of the relationship between markers 104 and data dots 102 in terms of their respective physical characteristic quantities and the dimensional range in which markers are allowed to fluctuate so that parameters can be computationally determined with ease if the physical characteristic quantity of markers 104 changed without using any parameter storage. Additionally, when a plurality of different sets of parameters are used to read dot codes having respective physical characteristic quantities that are different from each other, only parameters that are necessary and sufficient will be computationally determined to cover all the dot codes to be read so that right. markers 104 will be detected without mistakenly detecting data dots as markers to consequently reduce the time required for detecting markers.

[3rd Embodiment]

Now, the third embodiment of the invention will be discussed below.

Figure 10:
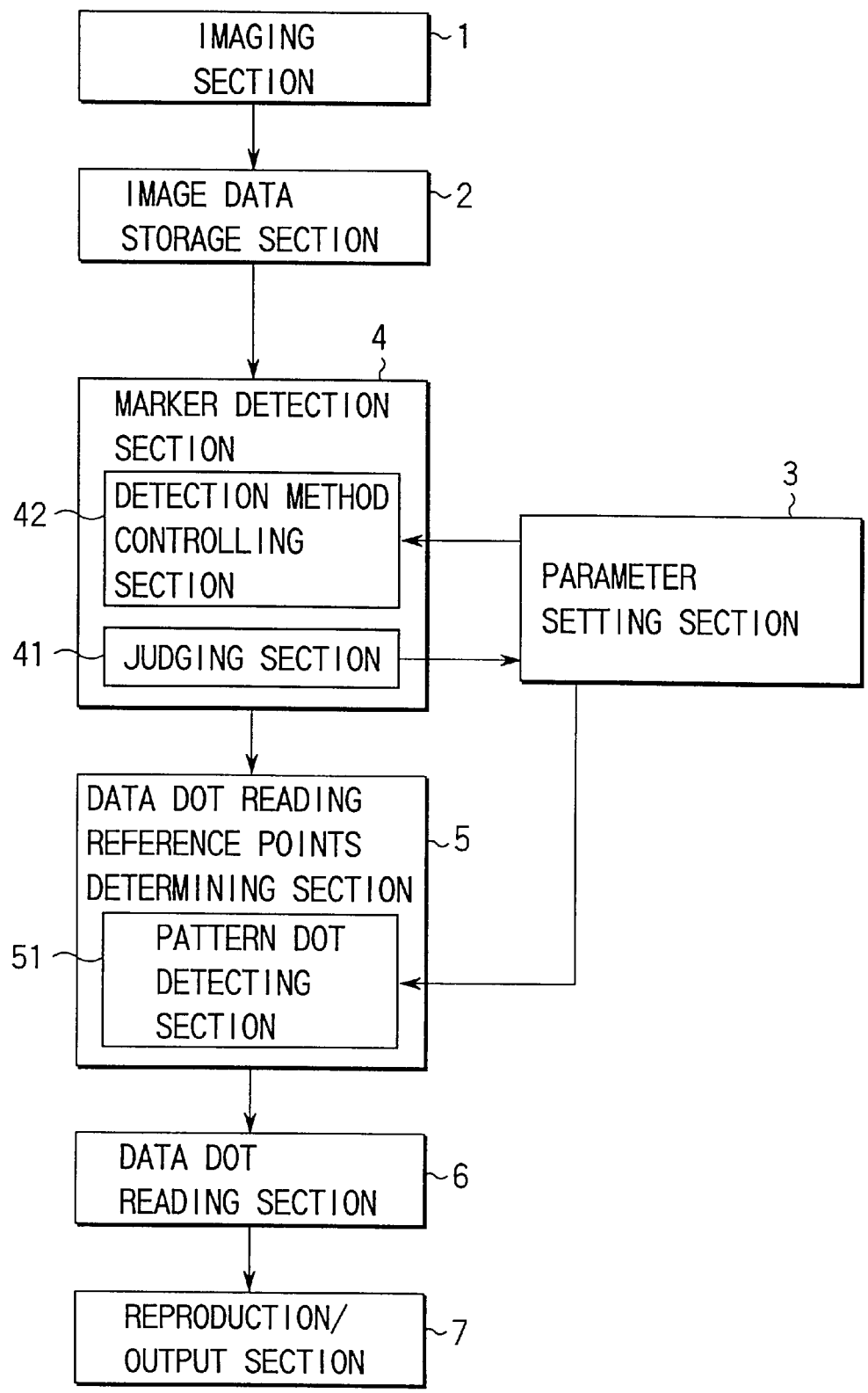
FIG. 10 is a schematic block diagram of a third embodiment of data reading apparatus according to the invention.

Referring to FIG. 10, this embodiment of data reading apparatus comprises an imaging section 1, an image data storage section 2, a parameter setting section 3, a marker detecting section 4, a data dot read reference points determining section 5, a data dot reading section 6 and a reproduction/output section 7. The marker detecting section 4 includes a judging section 41 and a detection method controlling section 42, whereas the data dot read reference points determining section 5 includes a pattern dot detecting section 51.

The operation and the effect of the second embodiment of data reading apparatus will be described below. However, the components of this embodiment that are same as those of the first embodiment are denoted respectively by the same reference numerals and would not be described any further.

A dot code that can be read by this embodiment typically has a configuration as shown in FIG. 4A. More specifically, it contains a plurality of data dots 102 arranged according to the data to be recorded that may be voice information, markers 104 arranged for providing data dot read reference points for the data dots 102 and maintaining a predetermined relationship with the data dots 102 in terms of predetermined physical characteristic quantity and pattern dots 103 to be used for computationally determining the reading points of the data dots 102, the pattern dots 103 maintaining a predetermined positional relationship with the markers 104, all of which are arranged to conform to a predetermined code format.

The detection method controlling section 42 appropriately controls the marker detection method in such a way that markers may be detected efficiently by means of the parameters set by the parameter setting section 3 and the pattern dot detecting section 51 detects pattern dots 103 on the basis of the positions of the markers 104 detected by the marker detecting section 4.

Firstly, the operation of the detection method controlling section 42 will be discussed below.

Figure 11:
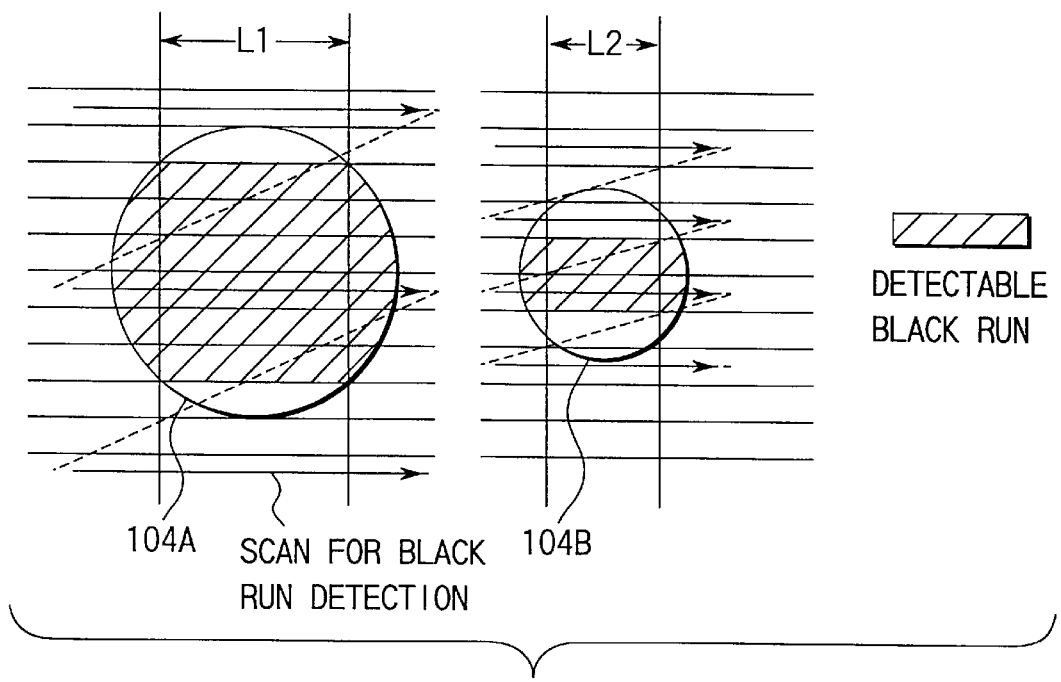
FIG. 11 is a schematic illustration of the threshold value for the run length of markers having different sizes and the number of lines containing detectable black runs.

Assume here that the marker detecting section 4 raster-scans the obtained code image to detect as markers black runs having a length exceeding the provided threshold value of run length and hence black pixels linked to them as described above by referring to the first embodiment. Also assume that there are markers 104A, 104B having different sizes as shown in FIG. 11 and their respectively threshold values of run length are L1, L2 (L1>L2). Then, markers of the two different sizes contain respective numbers of lines including detectable black runs that are different from each other. Thus, a detected larger marker candidate contains more black lines than a detected smaller marker candidate. Then, it is possible to detect black runs of a marker candidate by raster-scanning only selected lines that are arranged at regular intervals without raster-scanning all the lines of the obtained dot code image.

On the basis of this principle, the detection method controlling section 42 controls the intervals of the lines to be scanned depending on the size of markers to be detected. More specifically, the intervals of the lines to be scanned are increased when markers to be detected are of a large size, whereas those of the lines to be scanned are reduced when markers to be detected are of a small size. If markers 104A as shown in FIG. 11 are to be detected, it is sufficient for the marker detecting section 4 to raster-scan every fifth lines. If, on the other hand, markers 104B as shown in FIG. 11 are to be detected, the marker detecting section 4 will raster-scan every second lines.

Alternatively, it is also possible resample the entire dot code image depending on the size of markers to be detected in order to make all the dot codes in an image from which markers are to be detected to show a same size.

With this technique of controlling the marker detection method in order to carry out the marker detecting operation efficiently, the time required for detecting markers from a dot code can be significantly reduced.

While run length or optical density are used for the parameters for detecting markers in the first embodiment, it is also possible to define a region for a marker detecting operation in a manner as described below.

Assume here that markers 104 are to be detected from a dot code as shown in FIG. 4A.

It is necessary to detect at least a marker 104 from the dot code image before starting the operation of reading data dots 102. Then, it is desirable to detect at least a marker 104 from a predetermined region of the dot code image where the image is in a good condition, which may be a central region of the dot code image, in order to eliminate the risk of detecting a wrong marker due to distortion or shading.

Figure 12:
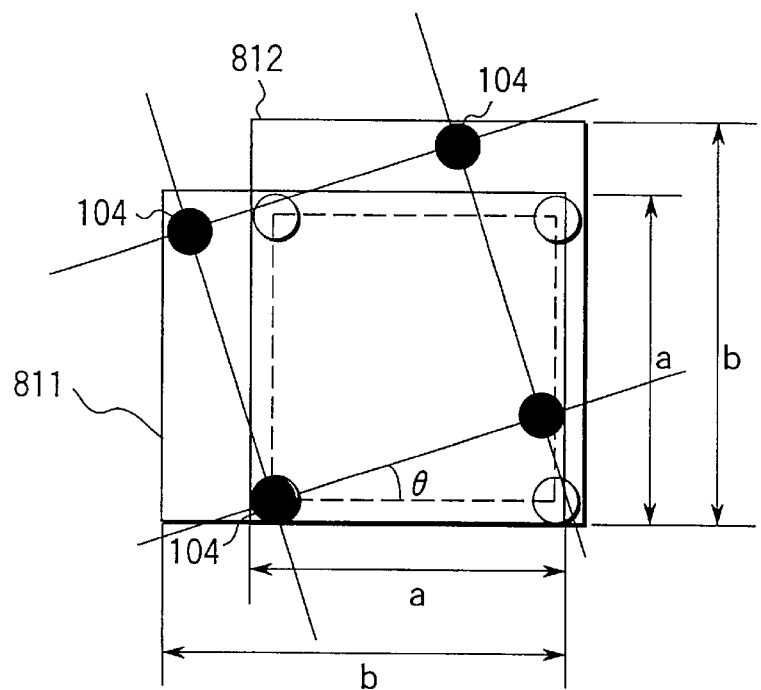
FIG. 12 is a schematic illustration of the first region for the detection of markers and the second region for the detection of markers to be used for data reading apparatus according to the invention.
Figure 13:
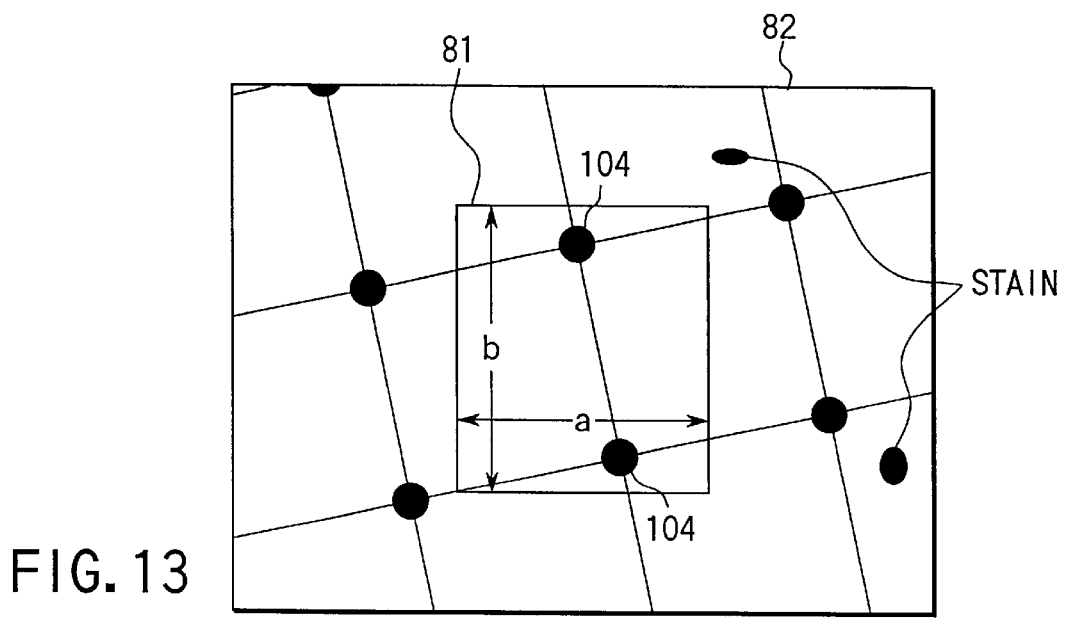
FIG. 13 is a schematic illustration of a marker detecting region.

If the allowable angle of rotation for the dot code at the time of picking up the image is θ, define a marker detecting region 81 in a central area of the picked up image where the image is in a good condition as shown in FIG. 13, which may be a first region 811 of a×b or a second region 812 of b×a, that contains only three out of the four markers 104 of a block 101 when the image is rotated by the allowable largest angle of θ but all the four markers 104 of the block 101 when the image is not rotated, or θ=0° as shown in FIG. 12. With this arrangement, when the dot code is picked up on the screen 32, at least a marker 104 is found within the marker detecting region 81 without fail so that the marker detecting section 4 can reliably detect the marker 104 from a central area of the screen where the image is in a good condition.

Figure 14A:
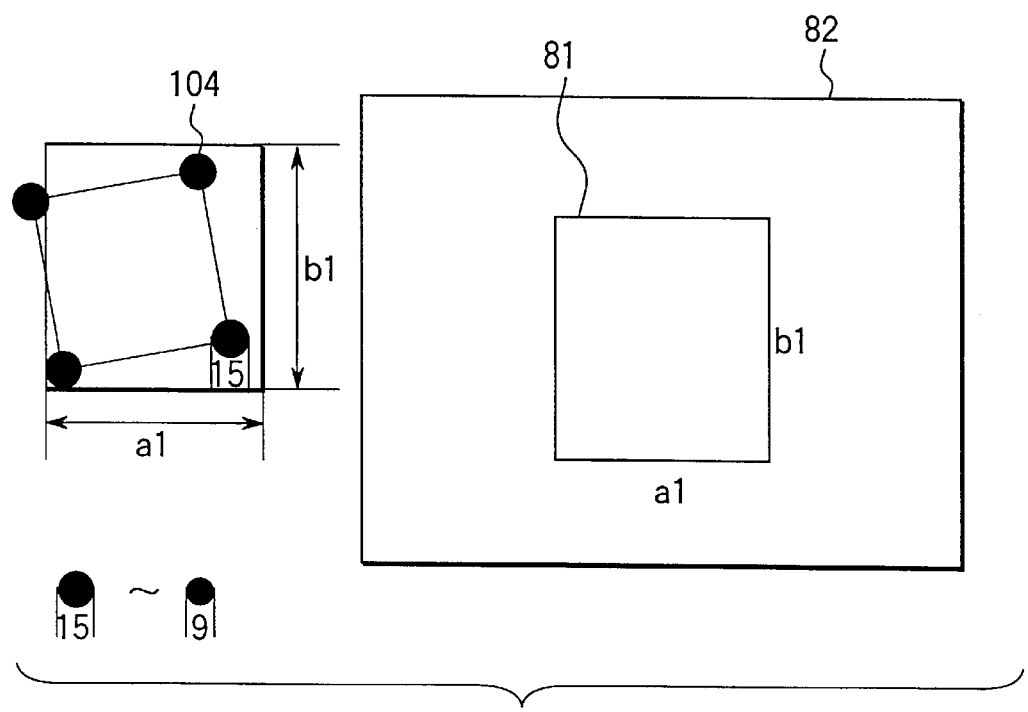
FIG. 14A is a schematic illustration of a marker detecting region determined on the basis of the blocks of a dot code containing markers having a size of "15"
Figure 14B:
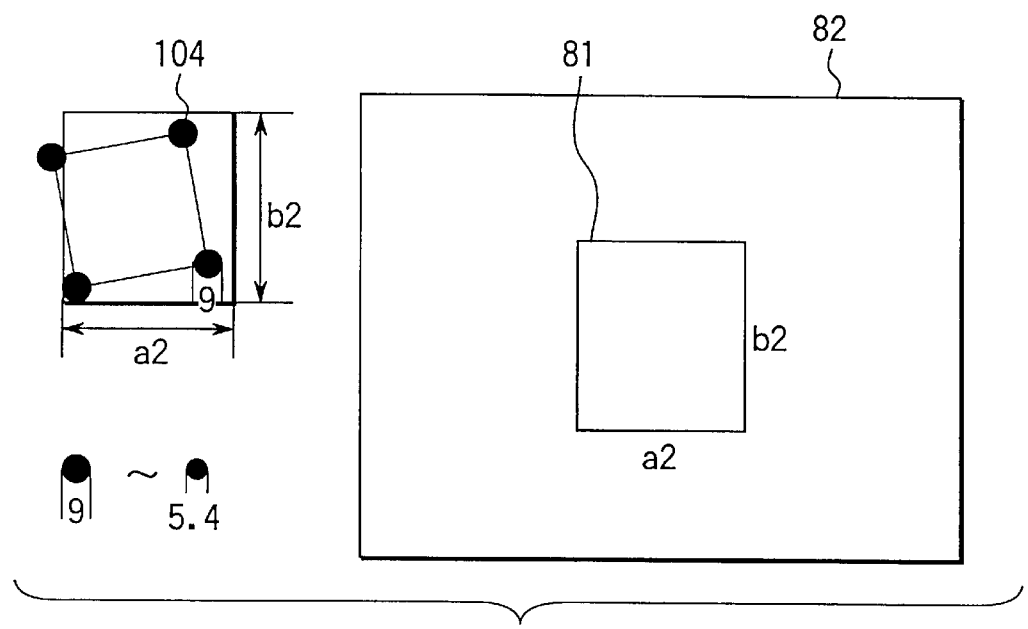
FIG. 14B is a schematic illustration a marker detecting region determined on the basis of the blocks of a dot code containing markers having a size of "9"

If the size of markers to be detected by means of a parameter is tolerated to fluctuate within a predetermined range, the marker detecting region 81 may be so defined as to accommodate a marker having the allowable largest size for the dot code to be picked up. For example, if it is so arranged that markers with a size between "15" and "9" are detected by means of the first parameter and those with a size between "9" and "5.4" are detected by means of the second parameter, a marker detecting region 81 of a1×b1 will be defined for a block of dot code containing markers with a size of "15" as shown in FIG. 14A and added as the first parameter and a marker detecting region 81 of a2×b2 will be defined for a block of dot code containing markers with a size of "9" as shown in FIG. 14B and added as the second parameter. Thus, the parameter setting section 3 defines a marker detecting region 81 for reliably detecting at least a marker 104 from a central area of the picked up image where the image is in a good condition on the basis of the largest size of dot code to be detected by a parameter and the allowable angle of rotation θ of dot code. Then, the marker detecting section 4 can reliably detect at least a marker 104 by detecting markers within the defined marker detecting region 81.

Figure 15A:
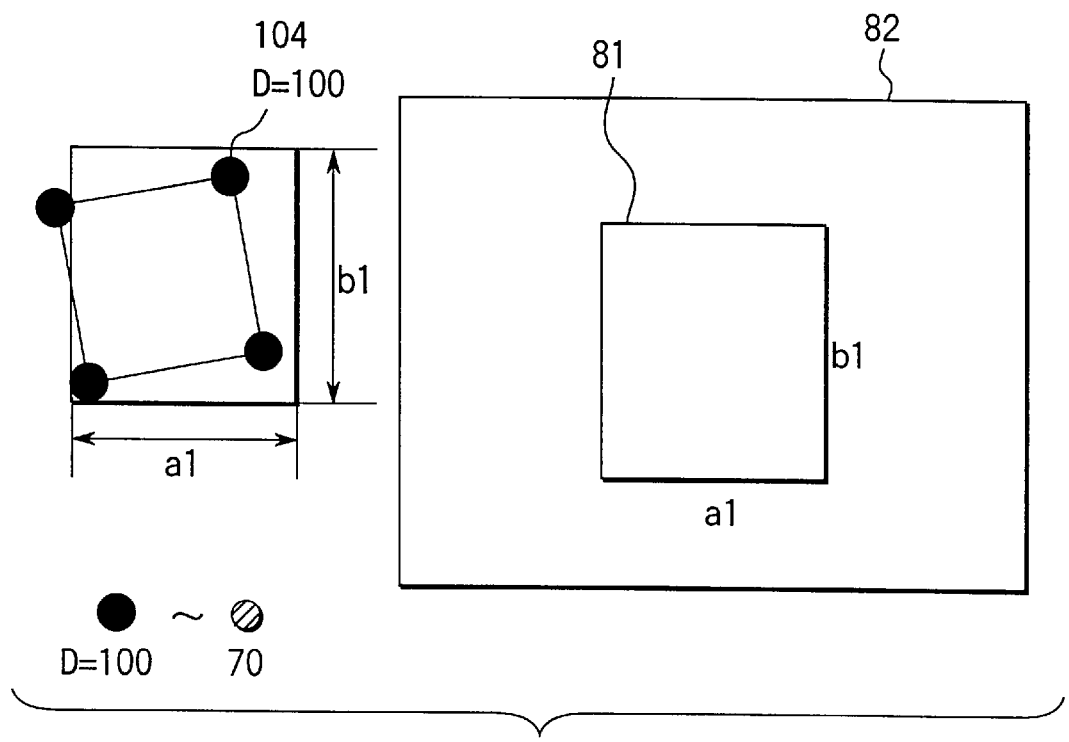
FIG. 15A is a schematic illustration of a marker detecting region to be used when detecting markers having an optical density of "100" in a dot code where the optical density of markers is correlated with the size of the dot code, the marker detecting region being determined on the basis of the size of the blocks of the dot code.
Figure 15B:
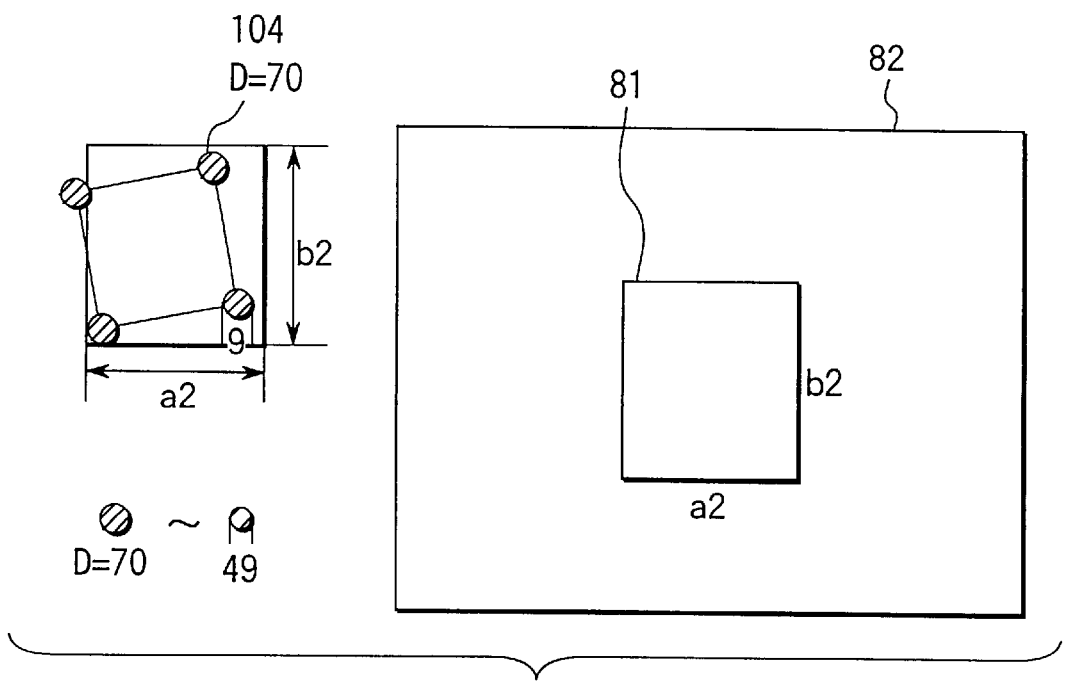
FIG. 15B is a schematic illustration of a marker detecting region to be used when detecting markers having an optical density of "70" in a dot code where the optical density of markers is correlated with the size of the dot code, the marker detecting region being determined on the basis of the size of the blocks of the dot code.

Now, an operation of detecting markers 104 from a dot code where the optical density of markers is correlated with the size of the dot code will be described by referring to FIGS. 15A and 15B.

In this instance, the optical density of markers is raised as the size of the dot code is increased. In this case again, a marker detecting region 81 is defined so as to make it possible to detect at least a marker 104 there on the basis of the block size of the dot code that corresponds to the optical density of markers to be detected in a manner described above (by referring to FIGS. 12 through 14B). If the optical density of markers to be detected by means of a parameter is tolerated to fluctuate within a predetermined range, the marker detecting region 81 may be so defined as to correspond to a dot code having the largest allowable block size within the detection tolerance. For example, if it is so arranged that markers with an optical density (D) between "100" and "70" are detected by means of the first parameter and those with an optical density between "70" and "49" are detected by means of the second parameter, a marker detecting region 81 of a1×b1 will be defined for a block of dot code containing markers with an optical density of "100" as shown in FIG. 15A and added as the first parameter and a marker detecting region 81 of a2×b2 will be defined for a block of dot code containing markers with an optical density of "70" and added as the second parameter. Thus, the parameter setting section 3 defines a marker detecting region 81 for reliably detecting at least a marker 104 from a central area of the picked up image where the image is in a good condition on the basis of the largest size of dot code to be detected by a parameter that corresponds to the optical density of markers 104 and the allowable angle of rotation θ of dot code. Then, the marker detecting section 4 can reliably detect at least a marker 104 by detecting markers within the defined marker detecting region 81.

Thus, with this arrangement of defining a limited marker detecting region 81 that is effective for detecting markers, it is now possible to reduce the time required for detecting markers and eliminate the risk of detecting wrong markers.

Generally, for determining the size of a dot code and the position and the rotation of the dot code relative to the picked up image 82, at least two reference spots have to be defined so that it is normally not possible to get such information from a single marker 104. Therefore, a technique for detecting a plurality of markers 104 from the obtained dot code image will be discussed below.

As described above, once a marker 104 is detected and its position is known, a marker detecting region 81 for detecting another marker of the block 101 to which the detected first marker belongs can be defined on the basis of the position of the detected first marker 104 (104-1), the largest value a1 and the smallest value a2 of the block size of the dot code which is an object to be detected by the parameters having been used in detecting the detected marker and corresponds to the optical density of markers and the allowable angle of rotation θ of the dot code.

Then, the parameter setting section 3 defines a marker detecting region 81 for detecting the second marker on the basis of the position of the detected first marker 104-1, the largest block size and the smallest block size of the dot code from which markers are detected by means of parameters and the allowable angle of rotation θ of the dot code so that the marker detecting section 4 easily and reliably detects the second marker from the defined marker detecting region 81. Then, the positions of the remaining two markers of the block 101 can be determined with ease on the basis of the positions of the detected two markers and the format information of the dot code without actually detecting them.

Figure 17:
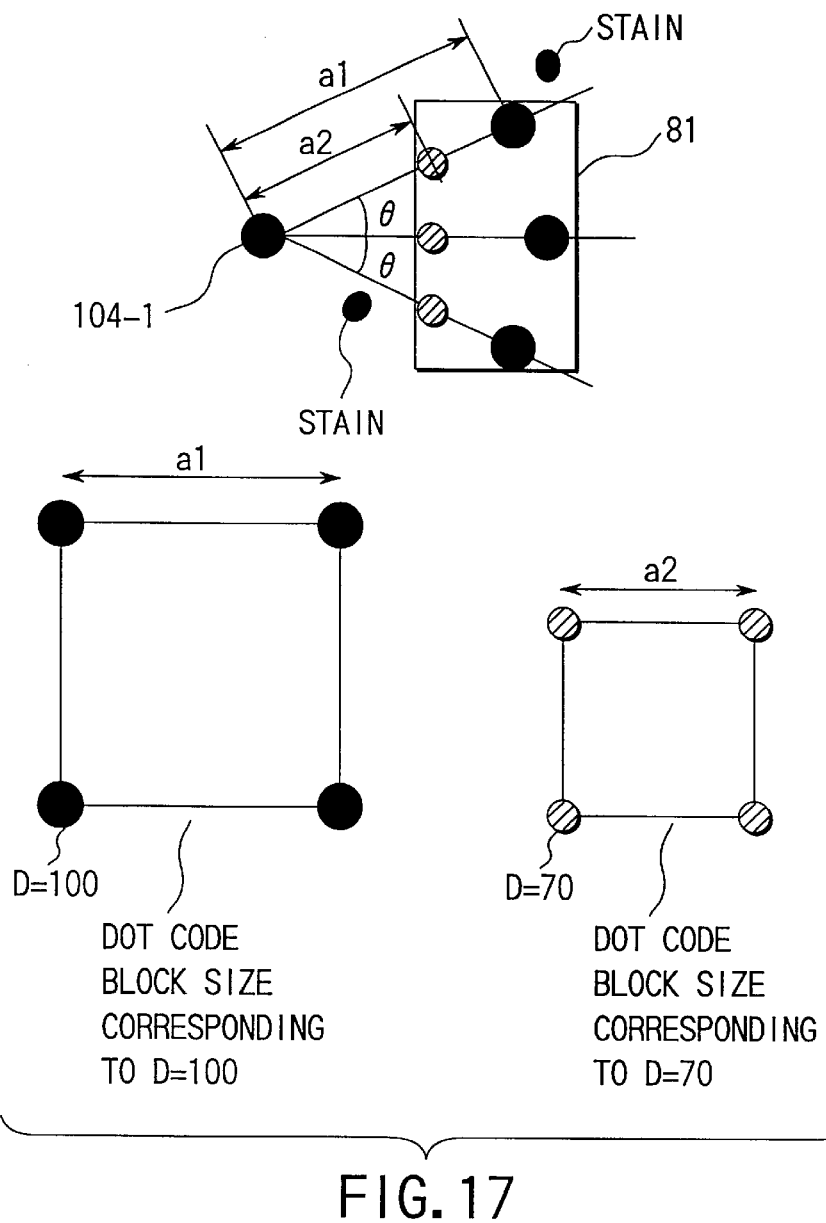
FIG. 17 is a schematic illustration of the set of a marker detecting region to be used when detecting markers in a dot code where the optical density of markers is correlated with the dot code size on the basis of the position of a detected marker as a limited effective region for detecting another marker.

The same will be true for an operation of detecting markers from a dot code where the optical density of markers 104 is correlated with the size of the dot code as shown in FIG. 17. More specifically, referring to FIG. 17, the marker detecting region 81 for detecting the second marker of the block 101 is defined on the basis of the position of the detected marker (first marker 104-1), the largest block size and the smallest block size of the dot code from which markers are detected by means of parameters and the allowable angle of rotation q of the dot code.

In this way, by defining a marker detecting region 81 that has a limited area but effective for detecting the second marker on the basis of the position of the detected marker (first marker 104-1), the time required for detecting markers can be further reduced and the risk of detecting wrong markers can be effectively eliminated.

Pattern dots 103 may be used to enhance the precision of determining data dot read reference points for reading data dots 102. This will be discussed below.

The markers of a dot code ideally have a circular contour. However, frequently they may not be ideally circular but stained and/or deformed when they are read into the image data storage section 2 depending on the condition under which the dot code is recorded on the recording medium and the condition under which the dot code is shot. If the center of such a defective marker 104 is used as data dot read reference point, each of the data dot reading points defined on the basis of the center of such a defective marker 104 may be displaced from the actual position of the corresponding data dot and then the data of the dot code may not be read correctly.

Figure 18:
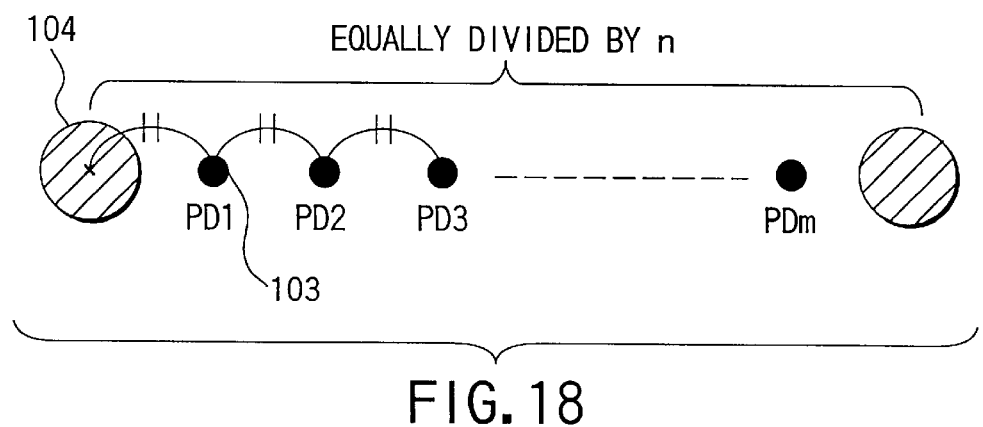
FIG. 18 is a schematic illustration of pattern dots.

In order to avoid this problem, the imaginary line connecting the centers of two markers that are located horizontally paired and form the block is equally divided by n to define spots and at least m (>1) pattern dots 103 that are as large as data dots are placed on so many spots as shown in FIG. 18. Then, the pattern dot detecting section 51 detects the pattern dots 103 by referring to the position of the detected marker 104. Then, a data dot read reference point (which is located at the true center of the marker 104 in this case) is computationally determined by minimizing the error functions obtained from the distances between the pattern dot reading points on the given format and the positions of the centers of the corresponding respective pattern dots that are actually detected. With this arrangement, the data dot reading points can be defined more accurately. The technique described in U.S. Pat. No. 5,866,895 so as to be used for a data reading apparatus as disclosed there can also be used for the above procedure.

Figure 19:
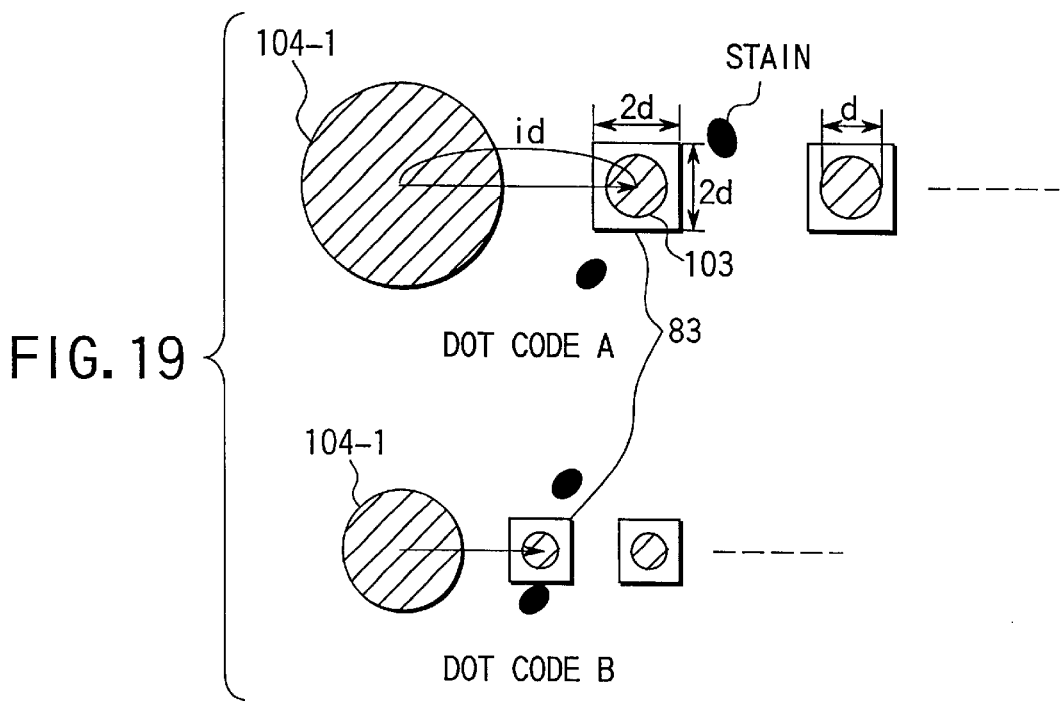
FIG. 19 is a schematic illustration of the set of a pattern dot detecting region in a dot code where the marker size is correlated with the dot code size.

In view of that the centers of markers 104 are not accurately located as described above, pattern dots will be detected within a pattern dot detecting region 83 showing a predetermined position and a predetermined size relative to the markers 104 of a block as shown in FIG. 19. Referring to FIG. 19, if the size of a data dot 102 (=that of a pattern dot 103) relative to that of a marker to be detected 104 is d and the distance between the marker 104 and the pattern dot 103 is i×d, a pattern dot detecting region 83 is defined as a square whose sides are as long as 2$d$ and whose center is located at a position separated from the detected marker (first marker 104-1) by a distance of i×d. It will be understood that the position and size of the pattern dot detecting region 83 varies in proportion to that of the dot code as shown in FIG. 19. In short, a pattern dot detecting region 83 is defined optimally relative to the size of markers to be detected.

Then, the parameter setting section 3 sets parameters to be used to detect markers and at the same time defines a pattern dot detecting region 83 whose size corresponds to the size of the dot code in which markers will be detected by means of the set parameters. This process of defining a pattern dot detecting region 83 will equally take place in a dot code where the optical density of markers 104 and the size of the dot code are correlated as shown in FIGS. 15A and 15B. In other words, the pattern dot detecting region 83 is defined as a parameter which have a size that is proportional to the size of the dot code that by turn corresponds to the optical density of markers to be detected by means of the set parameters for marker detection.

Figure 20:
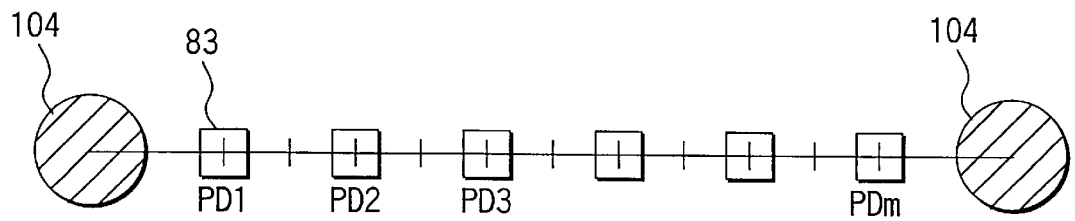
FIG. 20 is a schematic illustration of a method of setting a pattern dot detecting region on the basis of format information.
Figure 21:
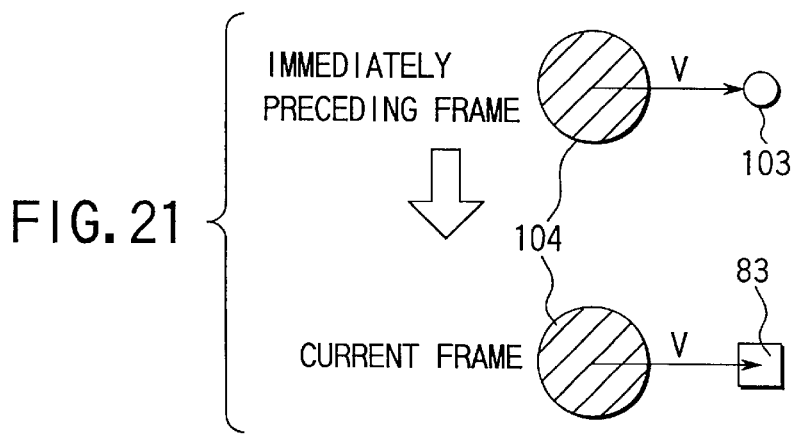
FIG. 21 is a schematic illustration of a method of setting a pattern dot detecting region on the basis of the positional relationship between the markers and the pattern dots obtained in the operation of processing the immediately preceding frame.

Then, the marker detecting section 4 detects markers 104 by means of the method described above by referring to the first embodiment and the pattern dot detecting section 51 finalizes the pattern dot detecting regions where it detects pattern dots on the basis of the positions of the markers detected by the marker detecting section 4 and the pattern dot detecting regions 83 defined by the parameter setting section 3 and actually carries out the operation of detecting pattern dots 103. The positional relationship between the detected markers 104 and the pattern dots 83 may be such that, as described above, the distance between two adjacently located markers is equally divided by n as shown in FIG. 20 and the centers of the pattern dots 103 arranged between them are determined on the basis of the format information. If continuously arranged dot codes are shot successively, it may be defined on the basis of the positional relationship between the markers 104 and the pattern dots 103 detected in the immediately preceding image (frame) as shown in FIG. 21.

With this arrangement of accurately defining data dot read reference points and also limited regions 103 effective for detecting pattern dots 103, the time required for detecting pattern dots 103 can be reduced without mistakenly detecting wrong pattern dots.

[4th Embodiment]

Now, the fourth embodiment of the invention will be described below.

Figure 22:
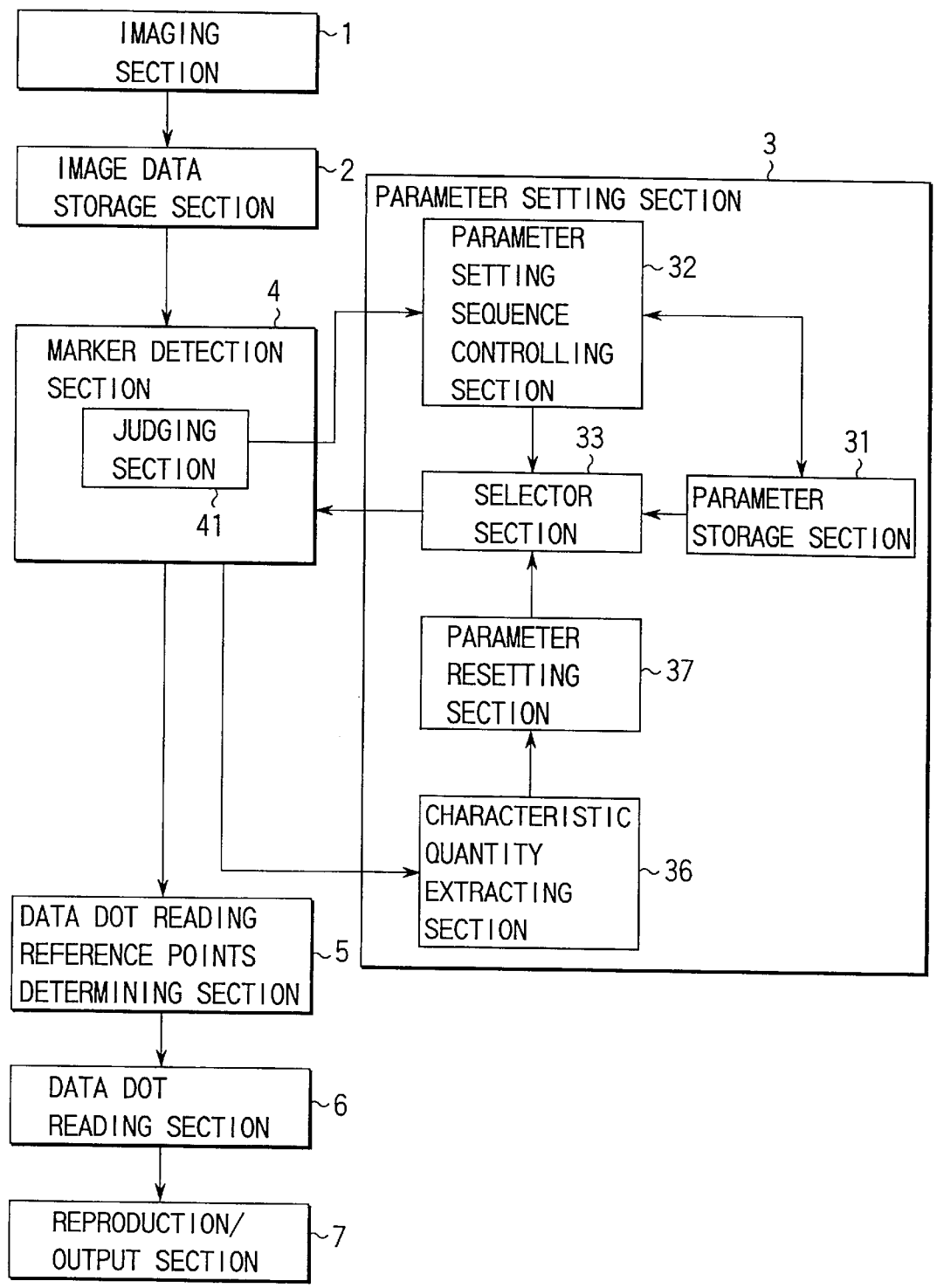
FIG. 22 is a schematic block diagram of a fourth embodiment of data reading apparatus according to the invention.

Referring to FIG. 22, this embodiment of data reading apparatus comprises an imaging section 1, an image data storage section 2, a parameter setting section 3, a marker detecting section 4, a data dot read reference points determining section 5, a data dot reading section 6 and a reproduction/output section 7. The parameter setting section 3 includes a parameter storage section 31, a parameter setting sequence controlling section 32, a selector section 33, a characteristic quantity extracting section 36 and a parameter resetting section 37, whereas the marker detecting section 4 includes a judging section 41.

The operation and the effect of the second embodiment of data reading apparatus will be described below. However, the components of this embodiment that are same as those of the first embodiment are denoted respectively by the same reference numerals and would not be described any further. Only the operation of resetting parameters will be discussed.

Firstly, the characteristic quantity extracting section 36 extracts a physical characteristic quantity of at least one of the markers 104 detected by the marker detecting section 4. A physical characteristic quantity as used herein refers to the diameter, the area or the optical density of markers or the distance separating adjacently located markers. In other words, it is a characteristic quantity of the dot code being read. The parameter resetting section 37 determines parameters that are optimal for reading the dot code on the basis of the physical characteristic quantity of markers extracted by the characteristic quantity extracting section 36 and sets them in the marker detecting section 4.

Figure 23:
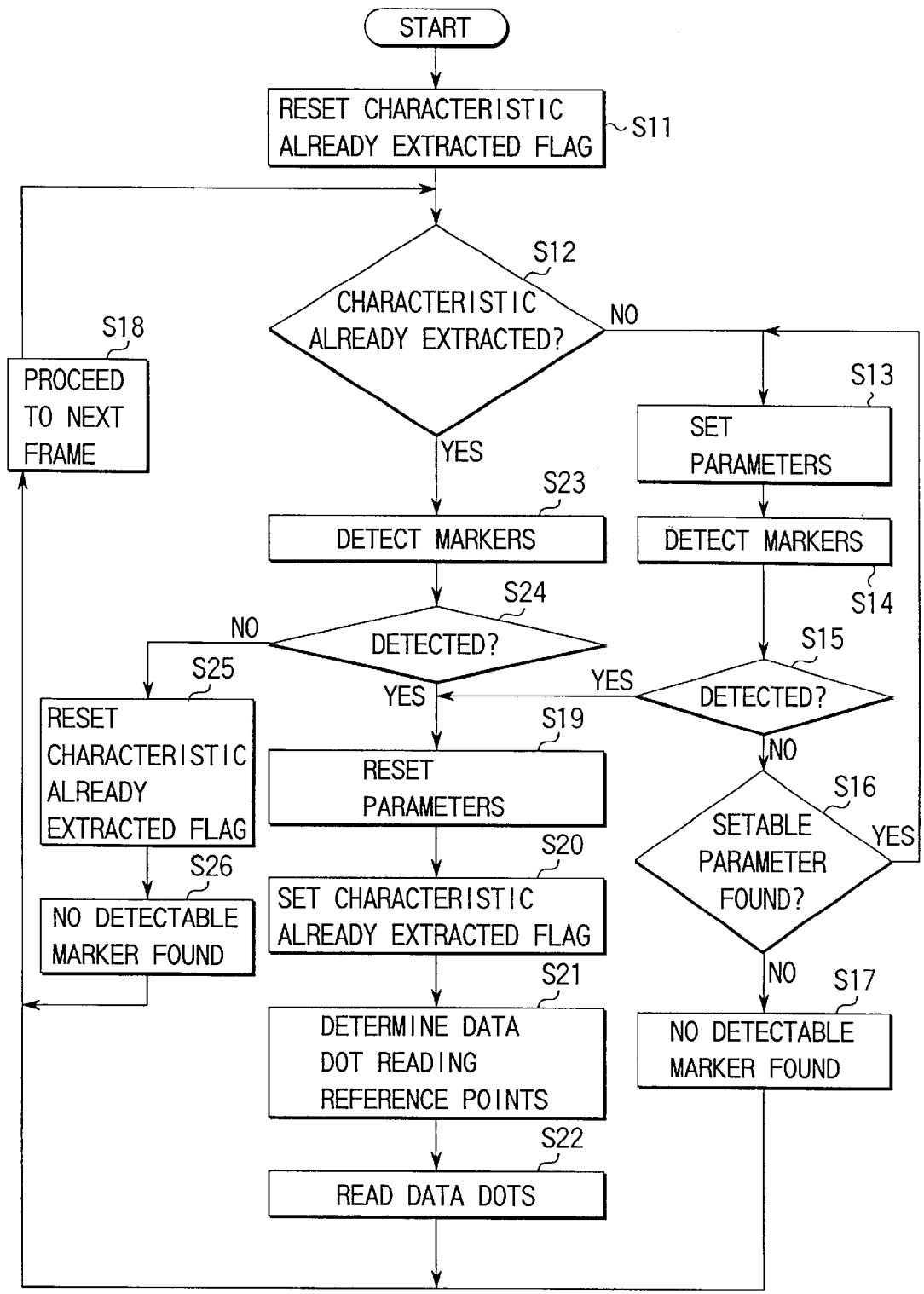
FIG. 23 is a flow chart of the operation of reading a dot code of the fourth embodiment of data reading apparatus.

This operation will be discussed in detail by referring to the flow chart of FIG. 23.

When starting the scan of the dot code to be read, the characteristic already extracted flag indicating that a physical characteristic (hereinafter referred to simply as characteristic) of markers is extracted by the characteristic quantity extracting section 36 is reset (Step S11). Subsequently, it is determined if the characteristic is detected from the image of the dot code picked up by the imaging section 1 and stored in the image data storage section 2 on the basis of the characteristic already extracted flag (Step S12).

If it is found that the characteristic of the dot code has not been extracted yet because the dot code has not been picked up yet or for some other reason, the parameter setting section 3 sets a parameter for detecting markers (Step S13) and the marker detecting section 4 detects markers by means of the set parameter (Step S14). Then, the judging section 41 determines if one or more than one markers are detected or not (Step S15). If no marker 104 is detected, it is determined if there is a parameter that can be set next or not (Step S16). If it is found that there is a parameter that can be set next, the selector section 33 selects the parameter and sets it in the marker detecting section 4 (Step S13) to repeat the process of detecting markers.

If, on the other hand, it is found in Step S16 that there is no parameter that can be set, it is determined that the frame contains no markers to be detected (Step S17) and the operation proceeds to the next frame (Step S18).

Meanwhile, if it is determined in Step S15 that one or more than one markers 104 are detected, the characteristic quantity extracting section 36 extracts a characteristic and the parameter resetting section 37 sets a parameter that is optimal to the dot code being read on the basis of the extracted characteristic and resets it in the marker detecting section 4 (Step S19). Note that the parameter that is newly set may be computationally determined on the basis of the extracted characteristic or alternatively it may be stored in advance in the parameter storage section 31 so that it may be selectively read out therefrom on the basis of the extracted characteristic. Subsequently, the characteristic already extracted flag indicating that a characteristic of the dot code is already extracted is set (Step S20) and the data dot read reference points determining section 5 determines data dot read reference points on the basis of the detected markers 104 (Step S21). Thereafter, the dot code reading section 6 actually reads the data dots 102 (Step S22) and the operation proceeds to the next frame (Step S18).

With this arrangement of setting parameters on the basis of the characteristic of the detected markers, other markers can be detected reliably without detecting wrong markers and/or missing right markers.

Once a characteristic is extracted by the characteristic quantity extracting section 36, it is always determined in Step S12 that the characteristic has already been extracted for the next frame because the characteristic already extracted flag is set. Then, markers 104 will be detected immediately by means of the parameters reset in the preceding frame (Step S23). Then, the judging section 41 determines if one or more than one markers are detected or not (Step S24) and, if it is determined that markers are detected, the operation proceeds to Step S19, where a characteristic is extracted from the detected markers and a parameter is reset on the basis of the characteristic before proceeding to the subsequent steps.

With this arrangement of setting a parameter to be used in the next frame on the basis of the characteristic detected in the current frame, the parameter to be used for detecting markers can be made optimal to eliminate the risk of missing right markers and/or detecting wrong markers regardless if the size of the dot code being picked up and being read is varied due to a change of the distance separating the dot code and the optical system picking up it.

If it is determined in Step S24 that no marker 104 is detected, the characteristic already extracted flag is reset (Step S25) and it is determined that the frame no longer contains markers to be detected for some reason or another (Step S26) and the operation proceeds to the next frame (Step S18). Since the characteristic already extracted flag is reset in the next frame, the parameter setting section 3 sets a parameter to be used for detecting markers (Step S13) and repeat the process of detection markers.

Thus, if no marker is detected by means of the reset parameter, the initial sequence of setting parameters will be resumed to restore the initial parameters so that the risk of missing right markers will be eliminated if the reset parameter is inappropriate.

The present invention is described above by way of preferred embodiments. However, the present invention is by no means limited to the above embodiments, which may be changed or modified in many different ways within the scope of the invention.

The present invention will be summarized below.

(1) A data reading apparatus comprising:

an imaging section for picking up an image of an optically readable dot code containing a plurality of data dots arranged according to the data to be recorded and markers providing data dot read reference points for reading the data dots and showing a predetermined relationship relative to the data dots in terms of a predetermined physical characteristic quantity, the data dots and the markers being arranged to show a predetermined positional relationship;

an image data storage section for storing the image data of the dot code picked up by the imaging section;

a parameter setting section for setting parameters to be used for detecting markers on the basis of the relationship between the data dots and the markers in terms of the predetermined physical characteristic quantity;

a marker detecting section for detecting markers from the image data stored in the image data storage section on the basis of the parameters set by the parameter setting section;

a data dot read reference points determining section for determining the data dot read reference points for reading the data dots of the dot code on the basis of the markers detected by the marker detecting section; and a data dot reading section for reading the data dots by referring to the data dot read reference points determined by the data dot read reference points determining section, wherein the parameter setting section being adapted to determine parameters suitable for detecting markers firstly without detecting data dots from the image data of the dot code stored in the image data storage section on the basis of the relative relationship between the data dots and the markers in terms of the physical characteristic quantity.

This arrangement covers the above described first embodiment having a configuration as shown in FIG. 3.

A dot code that can be read by a data reading apparatus as defined above contains a plurality of data dots 102 arranged according to the data to be recorded and markers 104 providing data dot read reference points for reading the data dots and showing a predetermined relationship relative to the data dots 102 in terms of a predetermined physical characteristic quantity (e.g., size, optical density, color, contour), the data dots 102 and the markers 104 being arranged to show a predetermined positional relationship according a predetermined format.

The parameter setting section 3 of FIG. 3 determines parameters necessary for the marker detecting section 4 to detect markers 104 from the dot code image stored in the image data storage section 2. The parameters are determined on the basis of the relative relationship between the markers 104 and the data dots 102 in terms of the predetermined physical characteristic quantity in such a way that markers 104 are detected firstly without detecting data dots 102. Then, the marker detecting section 4 detects markers 104 from the dot code image by means of the set parameters.

With the arrangement as defined above in (1), wrong markers would not be detected before detecting right markers 104 even if the condition under which the dot code is recorded is not known. As a result, the time required for detecting markers can be significantly reduced.

(2) A data reading apparatus according to (1) above, wherein the parameter setting section includes a parameter storage section for storing in advance a parameter determined on the basis of the relative relationship between the markers and the data dots in terms of the physical characteristic quantity in order to detect markers firstly without detecting data dots.

This arrangement also covers the first embodiment having a configuration as shown in FIG. 3. The parameter setting section 3 of this embodiment includes a parameter storage section 31.

The parameter storage section 31 of FIG. 3 stores in advance the parameter determined on the basis of the relative relationship between the markers and the data dots in terms of the physical characteristic quantity in order to detect markers firstly without detecting data dots. Then, the parameter setting section 3 reads the parameter stored in the parameter storage section 31 and determines parameters necessary for the marker detecting section 4 to detect markers.

With the arrangement as defined above in (2), a parameter can be computationally determined in advance and stored so that the time required for computationally determining the parameter can be eliminated from the operation of actually reading a data dot.

(3) A data reading apparatus according to (2) above, wherein the parameter storage section stores a plurality of parameters that are different from each other; and the parameter setting section includes a parameter setting sequence controlling section for sequentially selecting parameters out of the plurality of parameters on a one by one basis in an order good for detecting markers firstly from the image data stored in the image data storage section without detecting data dots.

This arrangement also covers the first embodiment having a configuration as shown in FIG. 3. The parameter setting section 3 of this embodiment includes a parameter storage section 31, a parameter setting sequence controlling section 32 and a selector section 33.

The parameter storage section 31 stores parameters to be used for detecting parameters 104 firstly without detecting data dots 102 and the parameter setting sequence controlling section 32 sequentially selects parameters out of the plurality of parameters stored in the parameter storage section 31 on a one by one basis in an order good for detecting markers from the image data stored in the image data storage section without detecting data dots. Then, the parameter setting section 3 sets the selected parameters in the marker detecting section 4.

With the arrangement as defined above in (3), a plurality of dot codes having respective physical characteristic quantities can be read by using the plurality of different parameters. Then, wrong markers would not be detected before detecting right markers 104 and, as a result, the time required for detecting markers can be significantly reduced.

(4) A data reading apparatus according to (3) above, wherein the parameter storage section divides the total variable range of the physical characteristic quantity of the markers to be detected by the marker detecting section into a plurality of ranges on the basis of the relative relationship between the markers and the data dots in terms of the physical characteristic quantity and on the basis of the total variable range so as to detect markers firstly without detecting data dots and stores a plurality of parameters for each of the ranges of the physical characteristic quantity of the markers to be detected.

This arrangement also covers the first embodiment having a configuration as shown in FIG. 3. The parameter setting section 3 of this embodiment includes a parameter storage section 31, a parameter setting sequence controlling section 32 and a selector section 33.

The parameter storage section 31 divides the total variable range of the physical characteristic quantity of the markers to be detected by the marker detecting section 4 into a plurality of ranges on the basis of the relative relationship between the markers 104 and the data dots 102 in terms of the physical characteristic quantity and on the basis of the total variable range so as to detect markers firstly without detecting data dots and stores a plurality of parameters for each of the ranges of the physical characteristic quantity of the markers 104 to be detected.

With the arrangement as defined above in (4), the total variable range of the physical characteristic quantity of the markers to be detected can be divided to a necessary and sufficient extent so that markers 104 can be detected efficiently by means of a minimal number of parameters.

(5) A data reading apparatus according to (1) above, wherein the parameter setting section includes a parameter computing section for computationally determining parameters to be used for detecting markers firstly without detecting data dots on the basis of the relative relationship between the markers and the data dots in terms of the physical characteristic quantity.

This arrangement covers the second embodiment having a configuration as shown in FIG. 9. The parameter setting section 3 of this embodiment includes a parameter computing section 35.

The parameter computing section 35 of FIG. 9 computationally determines parameters to be used for detecting markers 104 firstly without detecting data dots 102 on the basis of the relative relationship between the markers 104 and the data dots 102 in terms of the physical characteristic quantity. Then, the parameter setting section 3 sets the computationally determined parameters in the marker detecting section 4.

With the arrangement as defined above in (5), it is no longer necessary to computationally determine and store parameters in advance and parameters can be determined with ease if the physical characteristic quantity of the markers 104 to be detected is varied.

(6) A data reading apparatus according to (5) above, wherein the parameter setting section includes a parameter computing sequence controlling section for controlling the operation of the parameter computing section so as to make it computationally determine parameters in a sequence good for detecting markers firstly without detecting data dots from the image data stored in the image data storage section.

This arrangement also covers the second embodiment having a configuration as shown in FIG. 9. The parameter setting section 3 of this embodiment includes a parameter computing section 35 and a parameter computing sequence controlling section 34.

The parameter computing sequence controlling section 34 of FIG. 9 controls the operation of the parameter computing section 35 so as to make it computationally determine parameters in a sequence good for detecting markers 104 firstly without detecting data dots 102 and the parameter computing section 35 computationally determines parameters to be used for detecting markers 104 firstly without detecting data dots 102 on the basis of the relative relationship between the markers 104 and the data dots 102 in terms of the physical characteristic quantity. Then, the parameter setting section 3 sets the computationally determined parameters in the marker detecting section 4.

With the arrangement as defined above in (6), a plurality of dot codes having respective physical characteristic quantities can be read by using the plurality of different parameters, the number of which can be minimized for the purpose of efficiency. Then, wrong markers would not be detected before detecting right markers 104 and, as a result, the time required for detecting markers can be significantly reduced.

(7) A data reading apparatus according to (6) above, wherein the parameter computing section divides the total variable range of the physical characteristic quantity of the markers to be detected by the marker detecting section into a plurality of ranges on the basis of the relative relationship between the markers and the data dots in terms of the physical characteristic quantity and on the basis of the total variable range so as to detect markers firstly without detecting data dots and computationally determines the parameters in a sequence good for detecting markers having the physical characteristic quantity of each of the ranges.

This arrangement also covers the second embodiment having a configuration as shown in FIG. 9. The parameter setting section 3 of this embodiment includes a parameter computing section 35 and a parameter computing sequence controlling section 32.

The parameter computing section 35 divides the total variable range of the physical characteristic quantity of the markers 104 to be detected by the marker detecting section 4 into a plurality of ranges on the basis of the relative relationship between the markers 104 and the data dots 102 in terms of the physical characteristic quantity and on the basis of the total variable range so as to detect markers 104 firstly without detecting data dots 102 and computationally determines the parameters in a sequence good for detecting markers 104 having the physical characteristic quantity of each of the ranges.

With the arrangement as defined above in (7), the total variable range of the physical characteristic quantity of the markers to be detected can be divided to a necessary and sufficient extent so that markers 104 can be detected efficiently by means of a minimal number of computationally determined parameters.

(8) A data reading apparatus according to one of (1) through (7) above, wherein the marker detecting section further includes a judging section for determining if one or more than one markers are detected by means of the parameters set by the parameter setting section.

This arrangement also covers the first embodiment having a configuration as shown in FIG. 3. The marker detecting section 4 of this embodiment includes a judging section 41.

The judging section 41 of FIG. 3 determines if one or more than one markers are detected by means of the parameters set by the parameter setting section 3 or not and causes the operation to proceeds to a step of reading the data dots 102 or returns to a step of determining parameters according to its judgment. If necessary, it may issue a warning or take some other measure.

With the arrangement as defined in (8), the user can see if one or more than one markers are detected or not and hence can operate the data reading apparatus properly to make it adapted to the detected situation.

(9) A data reading apparatus according to one of (1) through (7) above, wherein the marker detecting section detects markers by means of a marker detecting method adapted to the parameters set by the parameter setting section.

This arrangement also covers the first embodiment having a configuration as shown in FIG. 10. The marker detecting section 4 of this embodiment includes a marker detecting method controlling section 42.

The marker detecting method controlling section 42 of FIG. 10 controls the marker detecting methods so as to select a marker detecting method adapted to the parameters set by the parameter setting section 3 without detecting wrong markers and the marker detecting section 4 detects markers 104 with the selected method.

With the arrangement as defined in (9), it is now possible to detect markers 104 with a method adapted to the parameters set by the parameter setting section 3 so that markers 104 can be detected in an efficient way to reduce the time required for the marker detecting operation.

(10) A data reading apparatus according to one of (1) through (7) above, wherein the physical characteristic quantity represents values indicating the size of the markers and that of the data dots; and the parameters set by the parameter setting section are threshold values for processing the markers and the data dots depending on their sizes.

This arrangement also covers the first embodiment having a configuration as shown in FIG. 3.

The data dots and the markers show a predetermined relationship in terms of their sizes as shown in FIGS. 6A and 7A.

The parameter setting section 3 of FIG. 3 determines parameters necessary for the marker detecting section 4 to detect markers 104 from the dot code image stored in the image data storage section 2. The parameters set by the parameter setting section 3 are threshold values determined on the basis of the relationship between the markers 104 and the data dots 102 in terms of their relative sizes and used so as to detect markers 104 firstly without detecting data dots 102.

With the arrangement as defined in (10) above for maintaining the relationship between the markers 104 and the data dots 102 of a dot code in terms of their relative sizes, markers 104 can be detected with ease by using the dimensional threshold values as parameters.

(11) A data reading apparatus according to one of (1) through (7) above, wherein the physical characteristic quantity represents values indicating the optical density of the markers and that of the data dots; and the parameters set by the parameter setting section are threshold values for processing the markers and the data dots depending on their optical densities.

This arrangement also covers the first embodiment having a configuration as shown in FIG. 3.

The data dots and the markers show a predetermined relationship in terms of their optical densities as shown in FIG. 8A.

The parameter setting section 3 of FIG. 3 determines parameters necessary for the marker detecting section 4 to detect markers 104 from the dot code image stored in the image data storage section 2. The parameters set by the parameter setting section 3 are threshold values determined on the basis of the relative relationship between the markers 104 and the data dots 102 in terms of their optical densities and used so as to detect markers 104 firstly without detecting data dots 102.

With the arrangement as defined in (11) above for maintaining the relative relationship between the markers 104 and the data dots 102 of a dot code in terms of their optical densities, markers 104 can be detected with ease by using the threshold values for optical density as parameters.

(12) A data reading apparatus according to (10) or (11) above, wherein the parameters set by the parameter setting section include a marker detecting region to be used by the marker detecting section for detecting markers from the image data stored in the image data storage section.

This arrangement covers the third embodiment having a configuration as shown in FIG. 10.

The parameter setting section 3 of FIG. 10 defines a marker detecting region 81 where at least a marker can be detected without fail on the basis of the block size of the dot code to be read as shown in FIGS. 12 through 14B, 15A and 15B. Then, the marker detecting section 4 detects markers 104 from the defined marker detecting region.

With the arrangement as defined in (12) above for defining a limited region that is effective for detecting markers, the time required for detecting markers is further reduced and the risk of detecting wrong markers can be eliminated.

(13) A data reading apparatus according to (10) or (11) above, wherein the marker detecting section detects a plurality of markers from the image data stored in the image data storage section; and the data dot read reference points determining section determines data dot read reference points on the basis of the plurality of markers detected by the marker detecting section;

the parameters set by the parameter setting section including a marker detecting region to be used by the marker detecting section for detecting the markers other than the first marker detected by the marker detecting section on the basis of the detected first marker.

This arrangement covers the third embodiment having a configuration as shown in FIG. 10.

Figure 16:
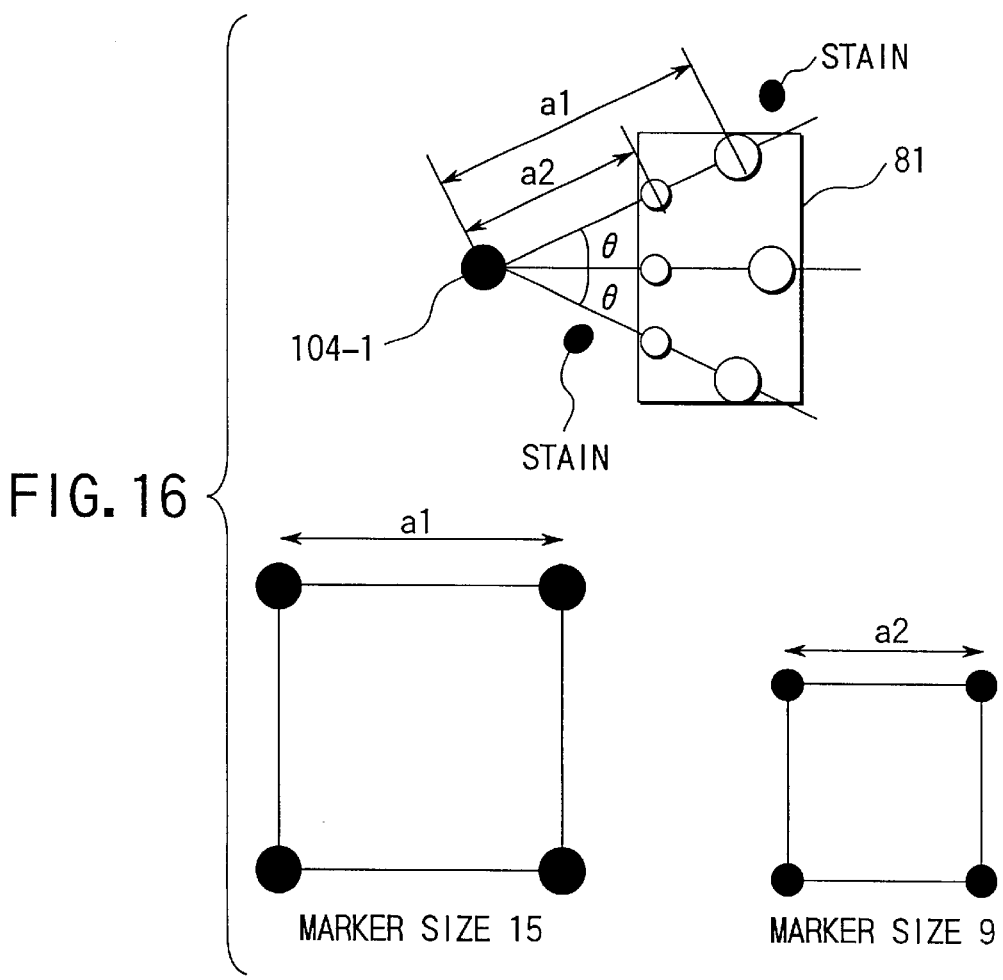
FIG. 16 is a schematic illustration of the set of a marker detecting region to be used when detecting markers in a dot code where the marker size is correlated with the dot code size on the basis of the position of a detected marker as a limited effective region for detecting another marker.

The parameter setting section 3 of FIG. 10 defines a marker detecting region 81 where the markers other than the first marker detected by the marker detection section 4 can be detected without fail on the basis of the detected first marker 104-1 and the block size of the dot code to be read as shown in FIGS. 16 and 17. Then, the marker detecting section 4 detects markers from the defined marker detecting region.

With the arrangement as defined in (13) above for defining a marker detecting region 81 where the markers other than the first marker detected by the marker detection section 4 can be detected without fail on the basis of the detected first marker 104-1, the time required for detecting the remaining markers can be reduced and the risk of detecting wrong markers can be eliminated.

(14) A data reading apparatus according to (10) or (11) above, wherein the dot code further contains a plurality of pattern dots arranged with a predetermined positional relationship relative to the data dots and the markers and used for determining the data dot read reference points; and the data dot read reference points determining section includes a pattern dot detecting section for detecting pattern dots by referring to the positions of the markers detected by the marker detecting section and is arranged to define the data dot read reference points on the basis of the plurality of pattern dots detected by the pattern dot detecting section;

the parameters set by the parameter setting section including a pattern dot detecting region for the pattern dot detecting section to detect pattern dots therefrom on the basis of the positions of the markers detected by the marker detecting section.

This arrangement covers the third embodiment having a configuration as shown in FIG. 10. The data dot read reference points determining section 5 of this embodiment includes a pattern dot detecting section 51.

A dot code that can be read by a data reading apparatus as defined above contains a plurality of data dots 102 arranged according to the data to be recorded, markers 104 providing data dot read reference points for reading the data dots and showing a predetermined relationship relative to the data dots 102 in terms of a predetermined physical characteristic quantity (e.g., size, optical density, color, contour), the data dots 102 and the markers 104 being arranged to show a predetermined positional relationship, and pattern dots 103 arranged with a predetermined positional relationship relative to the markers and used for computationally determining the reading points of the data dots 102, the data dots 102, the markers 104 and the pattern dots 103 being arranged to show a predetermined positional relationship according a predetermined format.

The parameter setting section 3 of FIG. 10 defines a pattern dot detecting region 83 where pattern dots 103 can be detected without fail on the basis of the block size of the dot code to be read as shown in FIGS. 20 and 21. Then, the pattern dot detecting section 51 detects pattern dots 103 from the defined pattern dot detecting region.

With the arrangement as defined in (14) above for defining a limited effective region for detecting pattern dots 103 prior to actually detecting pattern dots 103, the time required for detecting pattern dots can be further reduced and the risk of detecting wrong pattern dots 103 can be eliminated to define data dot read reference points with an enhanced level of accuracy.

(15) A data reading apparatus according to one of (1) through (7) above, wherein the parameter setting section includes:

a characteristic quantity extracting section for extracting a physical characteristic quantity relating to the at least one marker detected by the marker detecting section from the at least one marker; and a parameter resetting section for resetting parameters for the marker detecting section as determined on the basis of the physical characteristic quantity relating to the at least one marker extracted by the characteristic quantity extracting section.

This arrangement covers the fourth embodiment having a configuration as shown in FIG. 22. The parameter setting section 3 of this embodiment includes a characteristic quantity extracting section 36 and a parameter resetting section 37.

The characteristic quantity extracting section 36 extracts a physical characteristic quantity relating to the at least one marker detected by the marker detecting section from the at least one marker. A physical characteristic quantity relating to markers as used herein typically refers to the diameter, the area or the optical density of markers or the distance separating two markers and hence relates to the dot code being read. Then, the parameter resetting section 37 resets parameters that are optimal for reading the dot code on the basis of the physical characteristic quantity relating to the at least one marker extracted by the characteristic quantity extracting section 36 and sets them in the marker detecting section 4.

With the arrangement as defined in (15), parameters can be determined on the basis of the characteristic quantity of the detected at least one marker 104 so that the remaining markers can be detected without fail and the risk of detecting wrong makers and that of missing right markers can be eliminated.

(16) A data reading apparatus according to (15) above, wherein the parameter setting section sets parameters to be used for the next picked up image for each image picked up by the imaging section.

This arrangement also covers the fourth embodiment having a configuration as shown in FIG. 22. The parameter setting section 3 of this embodiment includes a characteristic quantity extracting section 36 and a parameter resetting section 37.

The parameter resetting section 37 determines optimal parameters for reading the dot code from each picked up image on the basis of the physical characteristic quantity relating to markers as extracted by the characteristic quantity extracting section 36 and sets them in the marker detecting section 4.

With the arrangement as defined in (16), parameters that are optimal for detecting markers can be set even if the size of the picked up image of the dot code fluctuates due to fluctuations in the distance between the dot code and the optical system during the imaging operation so that the risk of detecting wrong markers and that of missing right markers can be eliminated.

(17) A data reading apparatus according to (16), wherein the marker detecting section further includes a judging section for determining if one or more than one markers are detected by means of the parameters set by the parameter setting section; and the parameter setting section determines parameters to be used for detecting markers firstly without detecting data dots on the basis of the relative relationship between the markers and the data dots in terms of the physical characteristic quantity when the judging section determines that no marker is detected.

This arrangement also covers the fourth embodiment having a configuration as shown in FIG. 22. The marker detection section 4 of this embodiment includes a judging section 41.

When no marker is detected, the judging section determines that the current frame no longer contains any marker to be detected for some reason or another and controls the parameter setting section 3 in such a way that the parameter setting section 3 once again determines parameters for detecting markers 104 firstly without detecting data dots 102 on the basis of the relative relationship between the markers 104 and the dot codes 102 in terms of the physical characteristic quantity.

With the arrangement as defined in (17), if no marker is detected by means of the reset parameters, the initial operational sequence of setting parameters is resumed so that the initial parameters are restored even if the reset parameters are inadequate. Thus, the risk of missing right markers can be eliminated.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data reading apparatus comprising:

an imaging section for picking up an image of an optically readable dot code containing a plurality of data dots arranged according to data to be recorded and markers providing data dot read reference points for reading the data dots and showing a predetermined relationship relative to the data dots in terms of a predetermined physical characteristic quantity, said data dots and said markers being arranged to show a predetermined positional relationship;

an image data storage section for storing image data of the dot code picked up by said imaging section;

a parameter setting section for setting parameters to be used for detecting markers based on the relationship between the data dots and the markers in terms of the predetermined physical characteristic quantity;

a marker detecting section for detecting markers from the image data stored in said image data storage section based on the parameters set by said parameter setting section;

a data dot read reference points determining section for determining the data dot read reference points for reading the data dots of the dot code based on the markers detected by said marker detecting section; and a data dot reading section for reading the data dots by referring to the data dot read reference points determined by said data dot read reference points determining section;

wherein said parameter setting section is adapted to determine parameters suitable for detecting markers firstly without detecting data dots from the image data of the dot code stored in said image data storage section based on the relationship between the data dots and the markers in terms of said physical characteristic quantity.

2. The data reading apparatus according to claim 1, wherein:

said parameter setting section includes a parameter storage section for storing in advance a parameter determined based on the relationship between the markers and the data dots in terms of said physical characteristic quantity in order to detect markers firstly without detecting data dots.

3. The data reading apparatus according to claim 2, wherein:

said parameter storage section stores a plurality of parameters that are different from each other; and said parameter setting section includes a parameter setting sequence controlling section for sequentially selecting parameters out of said plurality of parameters on a one by one basis in an order good for detecting markers firstly from the image data stored in said image data storage section without detecting data dots.

4. The data reading apparatus according to claim 3, wherein:

said parameter storage section divides a total variable range of the physical characteristic quantity of the markers to be detected by said marker detecting section into a plurality of ranges based on the relationship between the markers and the data dots in terms of the physical characteristic quantity and based on the total variable range so as to detect markers firstly without detecting data dots and stores a plurality of parameters for each of the ranges of the physical characteristic quantity of the markers to be detected.

5. The data reading apparatus according to claim 1, wherein:

said parameter setting section includes a parameter computing section for computationally determining parameters to be used for detecting markers firstly without detecting data dots based on the relationship between the markers and the data dots in terms of said physical characteristic quantity.

6. The data reading apparatus according to claim 5, wherein:

said parameter setting section includes a parameter computing sequence controlling section for controlling operation of said parameter computing section so as to make said parameter computing section computationally determine parameters in a sequence good for detecting markers firstly without detecting data dots from the image data stored in said image data storage section.

7. The data reading apparatus according to claim 6, wherein:

said parameter computing section divides a total variable range of the physical characteristic quantity of the markers to be detected by said marker detecting section into a plurality of ranges based on the relationship between the markers and the data dots in terms of the physical characteristic quantity and based on the total variable range so as to detect markers firstly without detecting data dots and computationally determines said parameters in a sequence good for detecting markers having the physical characteristic quantity of each of the ranges.

8. The data reading apparatus according to claim 1, wherein:

said marker detecting section further includes a judging section for determining if one or more than one of the markers are detected by means of the parameters set by said parameter setting section.

9. The data reading apparatus according to claim 1, wherein:

said marker detecting section detects markers by means of a marker detecting method adapted to the parameters set by said parameter setting section.

10. The data reading apparatus according to claim 1, wherein:

said physical characteristic quantity represents values indicating sizes of said markers and said data dots; and the parameters set by said parameter setting section are threshold values for processing said markers and said data dots depending on their sizes.

11. The data reading apparatus according to claim 10, wherein:

the parameters set by said parameter setting section include a marker detecting region to be used by said marker detecting section for detecting markers from the image data stored in said image data storage section.

12. The data reading apparatus according to claim 10, wherein:

said marker detecting section detects a plurality of markers from the image data stored in said image data storage section; and said data dot read reference points determining section determines the data dot read reference points based on the plurality of markers detected by said marker detecting section;

the parameters set by said parameter setting section include a marker detecting region to be used by said marker detecting section for detecting the markers other than a first marker detected by said marker detecting section based on the detected first marker.

13. The data reading apparatus according to claim 10, wherein:

said dot code further contains a plurality of pattern dots arranged with a predetermined positional relationship relative to said data dots and said markers and used for determining said data dot read reference points; and said data dot read reference points determining section includes a pattern dot detecting section for detecting the pattern dots by referring to positions of the markers detected by said marker detecting section and is arranged to define said data dot read reference points based on the pattern dots detected by said pattern dot detecting section;

the parameters set by said parameter setting section include a pattern dot detecting region for the pattern dot detecting section to detect pattern dots therefrom based on the positions of the markers detected by said marker detecting section.

14. The data reading apparatus according to claim 1, wherein:
  said physical characteristic quantity represents values indicating optical densities of said markers and said data dots; and
  the parameters set by said parameter setting section are threshold values for processing said markers and said data dots depending on their optical densities.

15. The data reading apparatus according to claim 14, wherein:
  the parameters set by said parameter setting section include a marker detecting region to be used by said marker detecting section for detecting markers from the image data stored in said image data storage section.

16. The data reading apparatus according to claim 14, wherein:
  said marker detecting section detects a plurality of markers from the image data stored in said image data storage section; and
  said data dot read reference points determining section determines data dot read reference points based on the plurality of markers detected by said marker detecting section;
  the parameters set by said parameter setting section include a marker detecting region to be used by said marker detecting section for detecting the markers other than a first marker detected by said marker detecting section based on the detected first marker.

17. The data reading apparatus according to claim 14, wherein:
  said dot code further contains a plurality of pattern dots arranged with a predetermined positional relationship relative to said data dots and said markers and used for determining said data dot read reference points; and
  said data dot read reference points determining section includes a pattern dot detecting section for detecting the pattern dots by referring to positions of the markers detected by said marker detecting section and is arranged to define said data dot read reference points based on the pattern dots detected by said pattern dot detecting section;
  the parameters set by said parameter setting section include a pattern dot detecting region for the pattern dot detecting section to detect pattern dots therefrom based on the positions of the markers detected by said marker detecting section.

18. The data reading apparatus according to claim 1, wherein said parameter setting section includes:
  a characteristic quantity extracting section for extracting a physical characteristic quantity relating to at least one of the markers detected by said marker detecting section from said at least one marker; and
  a parameter resetting section for resetting parameters for said marker detecting section as determined based on the physical characteristic quantity relating to said at least one marker extracted by said characteristic quantity extracting section.

19. The data reading apparatus according to claim 18, wherein:
  said parameter setting section sets parameters to be used for a next picked up image for each image picked up by said imaging section.

20. The data reading apparatus according to claim 19, wherein:
  said marker detecting section further includes a judging section for determining if one or more than one of the markers are detected by means of the parameters set by said parameter setting section; and
  said parameter setting section determines parameters to be used for detecting markers firstly without detecting data dots based on the relationship between the markers and the data dots in terms of said physical characteristic quantity when said judging section determines that no marker is detected.

* * * * *